United States Patent
Esmaili et al.

(10) Patent No.: US 9,890,908 B1
(45) Date of Patent: Feb. 13, 2018

(54) CONTROL SYSTEM IN A GAS PIPELINE NETWORK TO INCREASE CAPACITY FACTOR

(71) Applicant: Air Products and Chemicals, Inc., Allentown, PA (US)

(72) Inventors: Ali Esmaili, Emmaus, PA (US); Catherine Catino Latshaw, Fogelsville, PA (US); Eric J. Guter, Corona del Mar, CA (US); Joshua David Isom, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 15/490,394

(22) Filed: Apr. 18, 2017

(51) Int. Cl.
| | | |
|---|---|---|
| *F17D 3/01* | (2006.01) | |
| *F17D 1/04* | (2006.01) | |
| *F17D 5/00* | (2006.01) | |
| *G05D 7/06* | (2006.01) | |
| *G05B 13/04* | (2006.01) | |
| *G06N 99/00* | (2010.01) | |
| *G05B 13/02* | (2006.01) | |

(52) U.S. Cl.
CPC ............... *F17D 3/01* (2013.01); *F17D 1/04* (2013.01); *F17D 5/005* (2013.01); *G05B 13/0265* (2013.01); *G05B 13/04* (2013.01); *G05D 7/0629* (2013.01); *G06N 99/005* (2013.01)

(58) Field of Classification Search
CPC .. F17D 3/01; F17D 1/04; F17D 5/005; G06N 99/005; G05B 13/0265; G05B 13/04; G05D 7/0629
USPC ........................................................ 700/282
See application file for complete search history.

(56) References Cited

U.S. PATENT DOCUMENTS

| | | | | |
|---|---|---|---|---|
| 4,200,911 A | * | 4/1980 | Matsumoto | E03B 7/02 137/119.06 |
| 4,835,687 A | * | 5/1989 | Martin | F17D 3/00 417/2 |
| 6,236,894 B1 | | 5/2001 | Stoisits et al. | |
| 6,697,713 B2 | | 2/2004 | Megan et al. | |
| 6,701,223 B1 | | 3/2004 | Rachford, Jr. et al. | |
| 6,993,403 B1 | | 1/2006 | Dadebo et al. | |

(Continued)

OTHER PUBLICATIONS

C.M. Correa-Posada, et al, "Gas Network Optimization: A comparison of Piecewise Llinear Models", Chemical Engineering Science, 2014, 1-24.

(Continued)

*Primary Examiner* — Sean Shechtman
*Assistant Examiner* — Mohammed Shafayet
(74) *Attorney, Agent, or Firm* — Larry S. Zelson

(57) ABSTRACT

A system and method for controlling delivery of gas, including a gas pipeline network having at least one gas production plant, at least one gas receipt facility of a customer, a plurality of pipeline segments, and a plurality of control elements, one or more controllers, and one or more processors. The hydraulic feasibility of providing an increased flow rate of the gas to the gas receipt facility of the customer is determined using a linearized pressure drop model. A latent demand of the customer for the gas is estimated using a latent demand model. Based on the hydraulic feasibility and the latent demand, a new gas flow request rate from the customer is received. A network flow solution is calculated based on the new gas flow request rate. The network flow solution is associated with control element setpoints used by a controller to control one or more control elements.

12 Claims, 17 Drawing Sheets

(56) References Cited

U.S. PATENT DOCUMENTS

| | | | |
|---|---|---|---|
| 7,561,928 B2 | 7/2009 | Peureux et al. | |
| 7,720,575 B2 | 5/2010 | Ferber et al. | |
| 8,762,291 B2* | 6/2014 | Neagu | G06Q 10/06 705/332 |
| 9,599,499 B1 | 3/2017 | Chaudhary et al. | |
| 2003/0144766 A1* | 7/2003 | Megan | G05D 16/20 700/301 |
| 2003/0192693 A1 | 10/2003 | Wellington | |
| 2005/0137810 A1* | 6/2005 | Esposito, Jr. | C01B 3/506 702/32 |
| 2005/0273204 A1* | 12/2005 | Hansen | G05D 7/005 700/282 |
| 2007/0204930 A1* | 9/2007 | Phallen | B67D 1/1234 141/83 |
| 2007/0260333 A1* | 11/2007 | Peureux | F17D 1/04 700/28 |
| 2009/0265292 A1 | 10/2009 | Harper | |
| 2010/0152900 A1* | 6/2010 | Gurciullo | C01B 3/384 700/272 |
| 2010/0174517 A1* | 7/2010 | Slupphaug | E21B 43/00 703/10 |
| 2010/0222911 A1 | 9/2010 | Castelijns et al. | |
| 2013/0211601 A1* | 8/2013 | Cheng | G06F 17/5018 700/282 |
| 2014/0005841 A1* | 1/2014 | Cheng | G05D 7/0617 700/282 |
| 2015/0136248 A1 | 5/2015 | Nagase et al. | |
| 2016/0072891 A1* | 3/2016 | Joshi | G05D 23/1393 370/254 |
| 2016/0209851 A1* | 7/2016 | Aughton | F17D 1/00 |

OTHER PUBLICATIONS

A. Gopalakrishnan, et al, "Economic Nonlinear Model Predictive Control for periodic optimal operation of gas pipeline networks", Computers and Chemical Engineering, 2013, 52, 90-99.

F. Tabkhi, et al, "Improving the Performance of Natural Gas Pipeline Networks Fuel Consumption Minimization Problems", American Institute of Chemical Engineers, 2010, 56, 946-964.

R.Z. Rios-Mercado, et al, "Optimization problems in natural gas transportation systems: A state-of-the-art review", Applied Energy, 2015, 147, 536-555.

K.G. Murty, et al, "Some NP-Complete Problems in Quadratic and Nonlinear Programming", Mathematical Programming, 1987, 39, 117-129.

R.K. Ahuja, et al, "Network Flows, Chapter 4 Shortest Paths: Label-Setting Algorithms", 1993, 93-132.

Ajinkya A. More, et al, "Analytical solutions for the Colebrook and White equation and for pressure drop in ideal gas flow in pipes", Chemical Engineering Science, 2006, 61, 5515-5519.

Dejan Brkic, "Lambert W Function in Hydraulics Problems", Mathematica Balkanica, 2012, 26, 285-292.

Alexander Martin, et al, "Mixed Integer Models for the Stationary Case of Gas Network Optimization", Math. Program., 2006, 563-582.

A. Martin, et al, "A Mixed Integer Approach for the Transient Case of Gas Network Optimization", 2007.

U.S. Appl. No. 15/490,268, filed Apr. 18, 2017 first named inventor Camilo Mancilla, titled Control System in a Gas Pipeline Network to Satisfy Pressure Constraints.

U.S. Appl. No. 15/490,268, Office Action dated Jul. 7, 2017.

U.S. Appl. No. 15/490,308, filed Apr. 18, 2017 first named inventor Camilo Mancilla, titled Control System in an Industrial Gas Pipeline Network to Satisfy Energy Consumption Constraints At Production Plants.

U.S. Appl. No. 15/490,308, Office Action dated Aug. 11, 2017.

U.S. Appl. No. 15/490,344, filed Apr. 18, 2017 first named inventor Catherine Catino Latshaw, titled Control System in a Gas Pipeline Network to Satisfy Demand Constraints.

U.S. Appl. No. 15/490,344, Office Action dated Jun. 27, 2017.

\* cited by examiner

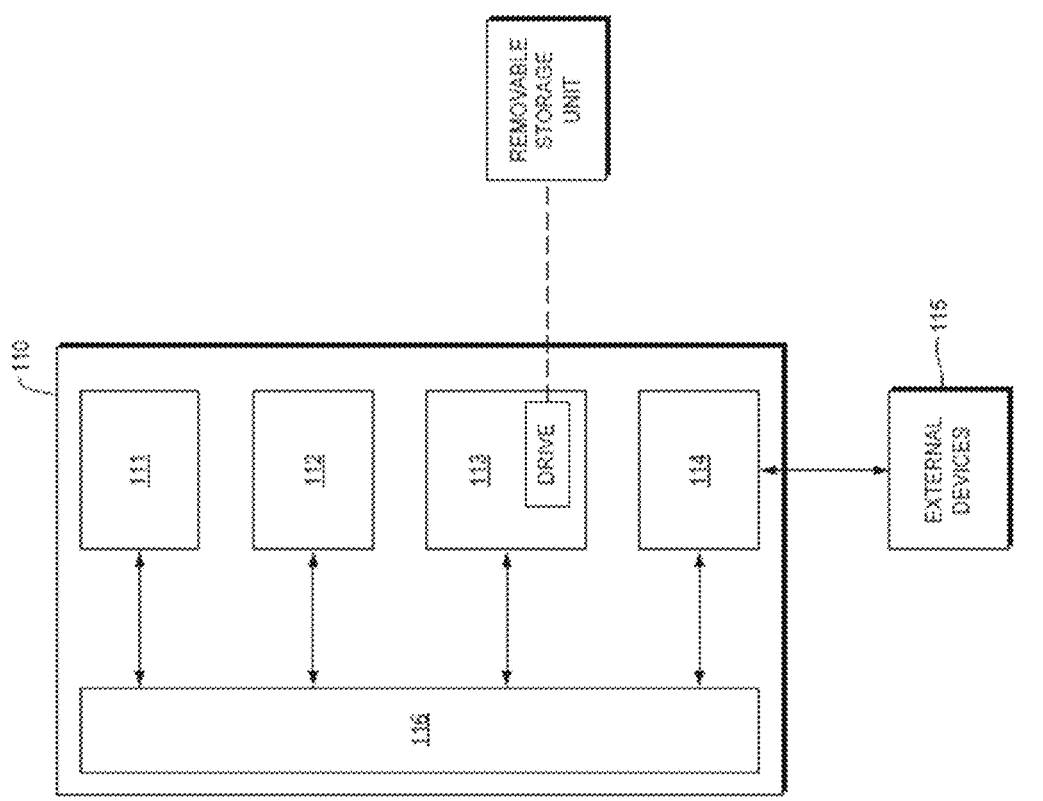

CONTROL SYSTEM IN A GAS PIPELINE NETWORK TO INCREASE CAPACITY FACTOR

FIELD OF THE INVENTION

This invention relates to control of gas pipeline networks for the production, transmission and distribution of a gas.

BRIEF SUMMARY OF THE INVENTION

The present invention involves a system and method for controlling delivery of gas. The system includes a gas pipeline network that includes at least one gas production plant, at least one gas receipt facility of a customer, a plurality of pipeline segments. The system further includes a plurality of control elements, one or more controllers, and one or more processors. The hydraulic feasibility of providing an increased flow rate of the gas to the gas receipt facility of the customer is determined using a linearized pressure drop model. A latent demand of the customer for the gas is estimated using a latent demand model. Based on the hydraulic feasibility and the latent demand, a new gas flow request rate from the customer is received. A network flow solution is calculated based on the new gas flow request rate. The network flow solution is associated with control element setpoints. At least one of the controllers receives data describing the control element setpoints and controls at least some of the plurality of control elements based on the data describing the control element setpoints.

In some embodiments, flow of gas within each of the plurality of pipeline segments is associated with a direction, the direction being associated with a positive sign or a negative sign. One or more of the one or more processors is further configured to develop the linearized pressure drop model by: bounding a minimum signed flow rate and a maximum signed flow rate for at least some of the plurality of pipeline segments based on an assumption of the customer receiving a flow rate of the gas that is greater than a flow rate of the gas currently received by the customer; and linearizing a nonlinear pressure drop relationship for at least some of the plurality of pipeline segment for flow rates between the minimum signed flow rate and the maximum signed flow rate.

In some embodiments, flow of gas within each of the plurality of pipeline segments is associated with a direction. The direction is associated with a positive sign or a negative sign. The processor may be further configured to calculate a minimum signed flow rate and a maximum signed flow rate for at least some of the plurality of pipeline segments by: bisecting a mathematical model of the gas pipeline network using at least one of the plurality of pipeline segments to create a left subnetwork and right subnetwork; calculating a minimum undersupply in the left subnetwork by subtracting a sum of demand rates for each of the gas receipt facilities in the left subnetwork from a sum of minimum production rates for each of the gas production plants in the left subnetwork; calculating a minimum unmet demand in the right subnetwork by subtracting a sum of maximum production rates for each of the gas production plants in the right subnetwork from a sum of demand rates for each of the gas receipt facilities in the right subnetwork; calculating the minimum signed flow rate for at least one of the pipeline segments as a maximum of a minimum undersupply in the left subnetwork and a minimum unmet demand in the right subnetwork; calculating a maximum oversupply in the left subnetwork by subtracting the sum of the demand rates for each of the gas receipt facilities in the left subnetwork from the sum of the maximum production rates for each of the gas production plants in the left subnetwork; calculating a maximum unmet demand in the right subnetwork by subtracting a sum of the minimum production rates for each of the gas production plants in the right subnetwork from the sum of the demand rates for each of the gas receipt facilities in the right subnetwork; and calculating the maximum signed flow rate for at least one of the pipeline segments as a minimum of a maximum oversupply in the left subnetwork and a maximum unmet demand in the right subnetwork.

In some embodiments, the latent demand model comprises a machine learning model, such as a classification tree or a support vector machine.

In some embodiments, the gas comprises hydrogen and at least one of the gas receipt facilities comprises a petroleum refinery.

BACKGROUND

Gas pipeline networks have tremendous economic importance. As of September 2016, there were more than 2,700,000 km of natural gas pipelines and more than 4,500 km of hydrogen pipelines worldwide. In the United States in 2015, natural gas delivered by pipeline networks accounted for 29% of total primary energy consumption in the country.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 1B illustrates an exemplary processing unit in accordance with an exemplary embodiment of the present invention.

Figure 1A:
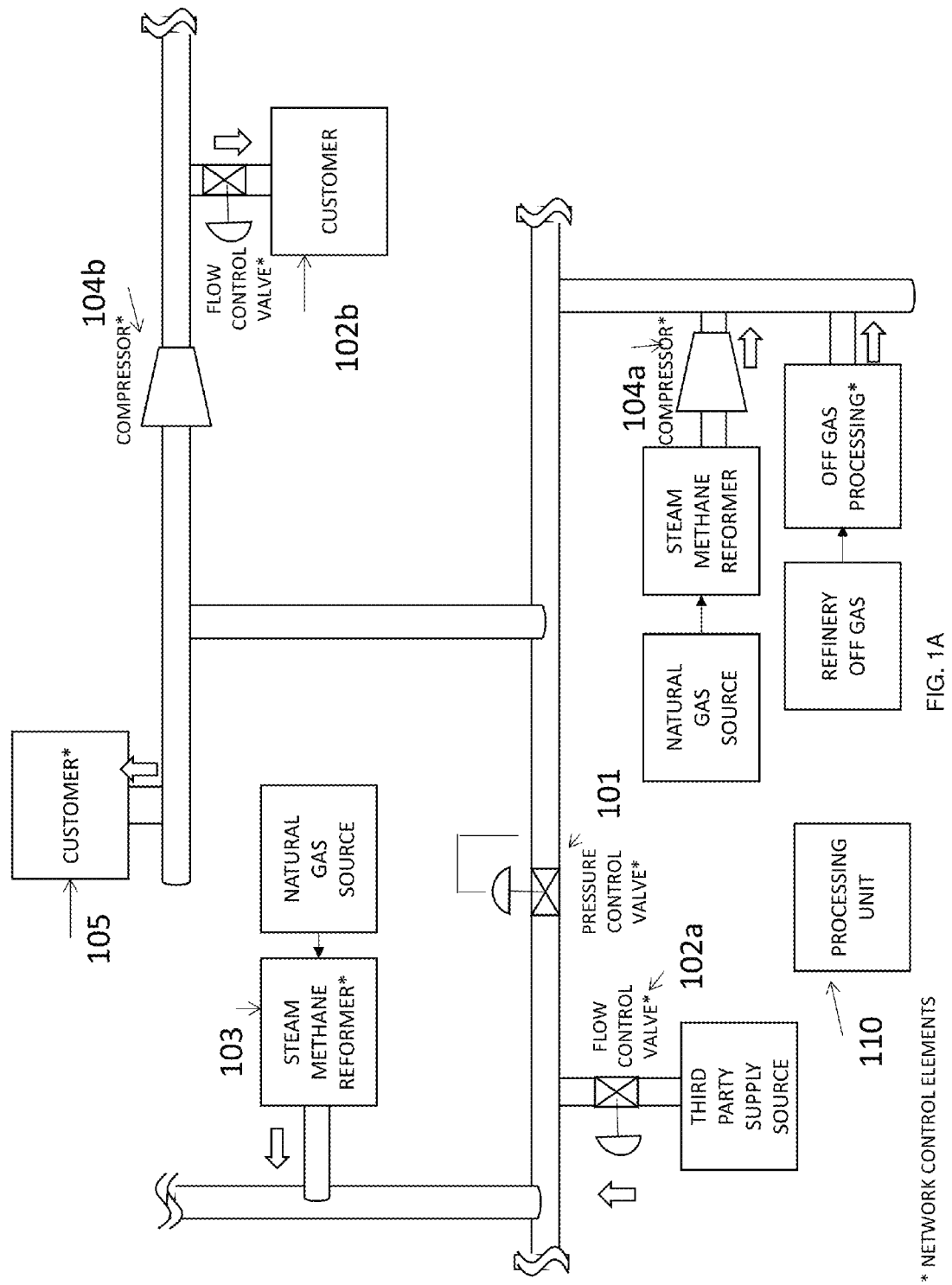
FIG. 1A illustrates and exemplary gas pipeline network.

The invention relates to the control of a gas pipeline network for the production, transmission, and distribution of a gas. Examples of gas pipeline networks include 1) natural gas gathering, transmission, and distribution pipeline networks; 2) pipeline networks for the production, transmission, and distribution of hydrogen, carbon monoxide, or syngas; 3) pipeline networks for the production, transmission, and distribution of an atmospheric gas.

Gas pipeline networks have constraints on the rates of gas that can be produced, transmitted, and distributed. In some cases, the constraints associated with production of the gas ultimately limit the amount that can be transmitted and distributed. In other cases, constraints associated with compressing and transmitting the gas are more constraining than constraints on production rates. In all cases, it is desirable to maximize the capacity factor of a gas pipeline network (defined as the total quantity of gas supplied divided by the total capacity of the pipeline). Maximizing the capacity factor lowers the total unit cost associated with the production, transmission, and distribution of the gas, thereby ultimately lowering costs for both the operator of the gas pipeline network and the consumer of the gas.

Maximizing the capacity factor of a gas pipeline network is difficult for several reasons. First, there are constraints on pressures within the gas pipeline network, and the nonlinear relationship between flow and pressure drops makes it difficult to identify operating conditions that simultaneously satisfy pressure constraints while maximizing the capacity factor. The determination of these operating conditions that satisfy pressure constraints while maximizing the capacity factor must be done quickly and reliably.

Second, maximizing the capacity factor of a gas pipeline network is difficult because demand for a gas is dynamic and fluid. Customer consumption rates of the gas often change. Furthermore, the amount of gas that could potentially be received and used by the customer at any given time is not a single fixed quantity. This is especially true of customers for industrial gases such as oxygen and nitrogen. Often, an industrial gas customer is able to benefit from increased flows of a gas because these increased flows would enable the customer to increase the capacity or quality of their own manufacturing process. For example, petroleum refineries often receive hydrogen gas from a hydrogen gas pipeline network. It is often the case that receiving additional hydrogen gas would enable them to increase their production of desulfurized gasoline and diesel. A condition under which a customer would benefit from gas flows higher than their current consumption is referred to as latent demand for the gas.

The third difficulty in maximizing the capacity factor of a gas pipeline network is the information asymmetry between the operator of the gas pipeline network and the gas customers. Operators of the gas pipeline network are typically able to monitor conditions within the network to determine when there is additional capability to supply gas to a customer, whereas the customers typically do not have visibility to network operating conditions and constraints. On the other hand, while customers may know when they would benefit from increased flows of the gas, they may not always communicate this unmet demand to the operator of the gas pipeline network in an ongoing fashion. In short, customers typically lack information on unused gas supply capacity, and gas pipeline network operators typically lack information on latent customer demand. This information asymmetry tends to lower the capacity factor of the network. What is needed is a system and method for controlling a gas pipeline network to maximize the capacity factor, a system and method which simultaneously considers unused gas supply capacity and relevant latent customer demand.

A system and method for maximizing the capacity factor of a gas network provides set points to control elements which are operable to regulate pressure and flow. Control elements are operable to receive setpoints for the flow or pressure of gas at a certain location in the network, and use feedback control to approximately meet the setpoint. FIG. 1A illustrates an exemplary hydrogen gas pipeline network. This exemplary network illustrates at least certain of the physical elements that are controlled in accordance with embodiments of the present invention. Thus, control elements include pressure control elements 101 and flow control elements 102a, 102b.

Industrial gas production plants associated with a gas pipeline network are control elements, because they are operable to regulate the pressure and flow of gas supplied into the network. Examples of industrial gas production plants include steam methane reformer plants 103 for the production of hydrogen, carbon monoxide, and/or syngas; and air separation units for the production of oxygen, nitrogen, and/or argon. These plants typically are equipped with a distributed control system and/or model predictive controller which is operable to regulate the flow of feedgas into the production plant and the flow and/or pressure of product gas supplied to the gas pipeline network.

Natural gas receipt points 104a, 104b are control elements, because they include a system of valves and/or compressors to regulate the flow of natural gas into the natural gas pipeline network.

Natural gas delivery points are control elements, because they include a system of valves and/or compressors to regulate the flow of natural gas out of the natural gas pipeline network.

Natural gas compressor stations are control elements, because they are operable to increase the pressure and regulate the flow of natural gas within a natural gas pipeline network.

Industrial gas customer receipt points 105 are control elements, because they are operable to receive a setpoint to regulate the flow and/or pressure of an industrial gas delivered to a customer.

Once available capacity and latent demand have been identified, setpoints can be received by flow control elements in order to increase the capacity factor of the network. To ensure that setpoints for flow control elements will result in satisfying demand and pressure constraints, it is necessary to calculate simultaneously the flows for each gas pipeline segment and gas pressures at network nodes. As described herein, in an exemplary embodiment, a network flow solution includes numerical values of flows for each pipeline segment and pressures for each pipeline junction that are: 1) self-consistent (in that laws of mass and momentum are satisfied), 2) satisfy customer demand constraints, and 3) satisfy pressure constraints.

The network flow solution may be determined using processing unit 110, an example of which is illustrated in FIG. 1B. Processing unit may be a server, or a series of servers, or form part of a server. Processing unit 110 comprises hardware, as described more fully herein, that is used in connection with executing software/computer programming code (i.e., computer readable instructions) to carry out the steps of the methods described herein. Processing unit 110 includes one or more processors 111. Processor 111 may be any type of processor, including but not limited to a special purpose or a general-purpose digital signal processor. Processor 111 may be connected to a communication infrastructure 116 (for example, a bus or network). Processing unit 110 also includes one or more memories 112, 113. Memory 112 may be random access memory (RAM). Memory 113 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data. In alternative implementations, memory 113 may include other similar means for allowing computer programs or other instructions to be loaded into processing unit 110. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to processing unit 110. Alternatively, the program may be executed and/or the data accessed from the removable storage unit, using the processor 111 of the processing unit 110. Computer system 111 may also include a communication interface 114. Communication interface 114 allows software and data to be transferred between processing unit 110 and external device(s) 115. Examples of communication interface 114 may include a modem, a network interface (such as an Ethernet card), and a communication port, by way of example. Software and data transferred via communication interface 114 are in the form of signals, which may be electronic, electromagnetic, optical, or other signals capable of being received by communication interface 114. These signals are provided to communication interface 114 via a communication path. Communication path carries signals and may be implemented using wire or cable, fiber optics, a phone line, a wireless link, a cellular phone link, a radio frequency link, or any other suitable communication channel, including a combination of the foregoing exemplary channels.

The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to processing unit 110. However, these terms may also include signals (such as electrical, optical or electromagnetic signals) that embody the computer program disclosed herein. Computer programs are stored in memory 112 and/or memory 113. Computer programs may also be received via communication interface 114. Such computer programs, when executed, enable processing unit 110 to implement the present invention as discussed herein and may comprise, for example, model predictive controller software. Accordingly, such computer programs represent controllers of processing unit 110. Where the invention is implemented using software, the software may be stored in a computer program product and loaded into processing unit 110 using removable storage drive, hard disk drive, or communication interface 114, to provide some examples.

External device(s) 115 may comprise one or more controllers that receive setpoint data from the software and are operable to control the network control elements described with reference to FIG. 1A.

It is difficult to calculate a network flow solution for a gas pipeline network because of a nonlinear equation that relates the decrease in pressure of a gas flowing through a pipeline segment (the "pressure drop") to the flow rate of the gas.

This nonlinear relationship between flow and pressure drop requires that a nonconvex nonlinear optimization program be solved to calculate a network flow solution. Nonconvex nonlinear programs are known to be NP-complete (see Murty, K. G., & Kabadi, S. N. (1987). Some NP-complete problems in quadratic and nonlinear programming. Mathematical programming, 39(2), 117-129.). The time required to solve an NP-complete problem increases very quickly as the size of the problem grows. Currently, it is not known whether it is even possible to solve a large NP-complete quickly.

Embodiments of the present invention involve a system and method for controlling a gas pipeline network in order to maximize the capacity factor of the network. Embodiments of the invention determine whether it is hydraulically feasible to provide an increased flow rate of the gas to a customer. Embodiments of the invention further estimate whether the customer has latent demand for the gas. If it is hydraulically feasible to supply increased flow rates of the gas to the customer, and the customer has latent demand, then an updated request rate for the gas is received from the customer (request rate referring to the flow rate of the gas). In the preferred embodiment, the request from the customer is prompted by the gas production entity, who indicates to the customer that it is believed the customer has latent demand and the gas production entity has the capacity to supply the gas. The updated request rate is used to calculate a network flow solution, constituting flow rates for each pipeline segment and pressures for each pipeline junction. Elements of the network flow solution are received as setpoints by control elements.

Embodiments of the invention use a classification tree to determine whether a customer has latent demand for the gas.

Determining whether it is hydraulically feasible to supply an increased flow rate of the gas to a customer, as well as calculating a network flow solution, are enabled by several novel elements. First, the flow rate ranges for each pipeline segment are bounded under various scenarios for the supply and demand of the gas. These bounds are computed using a novel and computationally efficient network bisection method which is based on bounding the demand/supply imbalance on either side of a pipe segment of interest. Second, embodiments of the invention find the best linearization of the relationship between flow rate and pressure drop for each pipe segment, given the true nonlinear relationship between flow rate and pressure drop as well as the computed minimum and maximum flow rates for each segment. Third, embodiments of the invention use a linear program to compute a network flow solution, given the linearization of the relationship between flow rate and pressure drop for each segment. The linear program incorporates prior bounds on the inaccuracy of the pressure drop linearization to ensure that the network flow solution associated with an increased flow of gas to the customer will meet pressure constraints, given the actual nonlinear pressure drop relationship.

The following provides the notation used to describe the preferred embodiments of the invention. The first column identifies the mathematical notation, the second column is a description of the mathematical notation, and the third column indicates the units of measure that may be associated with the quantity.

| Sets | | |
|---|---|---|
| $n \in N$ | Nodes (representing pipeline junctions) | |
| $j \in A$ | Arcs (representing pipe segments and control elements) | |
| $G = (N,A)$ | Graph representing the layout of the gas pipeline network | |
| $e \in \{in, out\}$ | Arc endpoints | |
| $(n,j) \in A_{in}$ | Inlet of arc j intersects node n | |
| $(n,j) \in A_{out}$ | Outlet of arc j intersects node n | |
| $n \in D \subset N$ | Demand nodes | |
| $n \in S \subset N$ | Supply nodes | |
| $j \in P \subset A$ | Pipe arcs | |
| $j \in C \subset A$ | Control element arcs | |
| $L_j \in N$ | Left subgraph for arc j | |
| $R_j \in N$ | Right subgraph for arc j | |
| Parameters | | |
| $D_j$ | Diameter of pipe j | [m] |
| $R$ | Gas constant | [N m kmol$^{-1}$ K$^{-2}$] |
| $Z$ | Compressibility factor | [no units] |
| $L_j$ | Length of pipe j | [m] |
| $M_W$ | Molecular weight of the gas | [kg kmol$^{-1}$] |
| $T_{ref}$ | Reference temperature | [K] |
| $\epsilon$ | Pipe roughness | [m] |
| $a$ | Nonlinear pressure drop coefficient | [Pa kg$^{-1}$ m$^{-1}$] |
| $f_j$ | Friction factor for pipe j | [no units] |
| $\mu$ | Gas viscosity | [Pa s] |
| $Re_j$ | Reynold's number for flow in pipe j | [no units] |
| $q_j^{min}$ | Minimum flow rate for flow in pipe j | [kg/s] |
| $q_j^{max}$ | Maximum flow rate for flow in pipe j | [kg/s] |
| $b_j$ | Intercept for linear pressure drop model for pipe j | [Pa$^2$] |
| $m_j$ | Slope for linear pressure drop model for pipe j | [Pa$^2$ s/kg] |
| $\Delta_n$ | Maximum additional amount to be supplied to customer in node n | [kg/s] |
| $s_n^{min}$ | Minimum production in node n | [kg/s] |
| $s_n^{min}$ | Maximum production in node n | [kg/s] |
| Variables | | |
| $d_n$ | Demand supplied rate in node n | [kg/s] |
| $q_j$ | Flow rate in pipe j | [kg/s] |
| $s_n$ | Production rate in node n | [kg/s] |
| $p_n^{node}$ | Pressure at node n | [Pa] |
| $p_j^e$ | Pressure at a particular end of a particular pipe | [Pa] |
| $ps_n^{node}$ | Squared pressure at node n | [Pa$^2$] |
| $ps_j^e$ | Squared pressure at a particular end of a particular pipe | [Pa$^2$] |
| $ps_j^{err}$ | Maximum absolute squared pressure drop error for pipe j | [Pa$^2$] |
| $ps_n^{err}$ | Maximum absolute squared pressure error for node n | [Pa$^2$] |

For the purposes of determining whether it is hydraulically feasible to provide an increased flow of gas to a customer, as well as for the purpose of computing a network flow solution, the layout of the pipeline network is represented by an undirected graph with a set of nodes (representing pipeline junctions) and arcs (representing pipeline segments and certain types of control elements). Here, some basic terminology associated with undirected graphs is introduced.

An undirected graph $G=(N,A)$ is a set of nodes N and arcs A. The arc set A consists of unordered pairs of nodes. That is, an arc is a set $\{m, n\}$, where m, $n \in N$ and $m \neq n$. By convention, the notation $(m,n)$, is used, rather than the notation $\{m, n\}$, and $(m,n)$ and $(n,m)$ are considered to be the same arc. If $(m,n)$ is an arc in an undirected graph, it can be said that $(m,n)$ is incident on nodes m and n. The degree of a node in an undirected graph is the number of arcs incident on it.

If $(m,n)$ is an arc in a graph $G=(N,A)$, it can be said that node m is adjacent to node n. The adjacency relation is symmetric for an undirected graph. If m is adjacent to n in a directed graph, sometimes it is written $m \to n$.

A path of length k from a node m to a node m' in a graph $G=(N,A)$ is a sequence $<n_0, n_1, n_2, \ldots, n_k>$ of nodes such that $m=n_0$, $m'=n_k$, and $(n_{i-1},n_i) \in A$ for $i=1, 2, \ldots, k$. The length of the path is the number of arcs in the path. The path contains the nodes $n_0, n_1, n_2, \ldots, n_k$ and the arcs $(n_0, n_1)$, $(n_1, n_2), \ldots, (n_{k-1}, n_k)$. (There is always a 0-length path from m to m). If there is path p from m to m', it is said that m' is reachable from m via p. A path is simple if all nodes in the path are distinct.

A subpath of path $p=<n_0, n_1, n_2, \ldots, n_k>$ is a contiguous subsequence of its nodes. That is, for any $0 \leq i \leq j \leq k$, the subsequence of nodes $<n_i, n_{i+1}, \ldots, n_j>$ is a subpath of p.

In an undirected graph, a path $<n_0, n_1, n_2, \ldots, n_k>$ forms a cycle if $k \geq 3$, $n_0 = n_k$, and $n_1, n_2, \ldots, n_k$ are distinct. A graph with no cycles is acyclic.

An undirected graph is connected if every pair of nodes is connected by a path. The connected components of a graph are the equivalence classes of nodes under the "is reachable from" relation. An undirected graph is connected if it has exactly one connected component, that is, if every node is reachable from every other node.

A graph $G'=(N',A')$ is a subgraph of $G=(N,A)$ if $N' \subseteq N$ and $A' \subseteq A$. Given a set $N' \subseteq N$, the subgraph of G induced by N' is the graph $G'=(N',A')$, where $A'=\{(m,n) \in A: m, n \in N'\}$.

To establish a sign convention for flow in a gas pipeline network represented by an undirected graph, it is necessary to designate one end of each pipe arc as an "inlet" and the other end as an "outlet":

$(n,j) \in A_{in}$ Inlet of arc j intersects node n
$(n,j) \in A_{out}$ Outlet of arc j intersects node n This assignment can be done arbitrarily, as embodiments of the present invention allows for flow to travel in either direction. By convention, a flow has a positive sign if the gas is flowing from the "inlet" to the "outlet", and the flow has a negative sign if the gas is flowing from the "outlet" to the "inlet".

Some nodes in a network are associated with a supply for the gas and/or a demand for the gas. Nodes associated with the supply of a gas could correspond to steam methane reformers in a hydrogen network; air separation units in an atmospheric gas network; or gas wells or delivery points in a natural gas network. Nodes associated with a demand for the gas could correspond to refineries in a hydrogen network; factories in an atmospheric gas network; or receipt points in a natural gas network.

A set of mathematical equations govern flows and pressures within a gas pipeline network. These equations derive from basic physical principles of the conservation of mass and momentum. The mathematical constraints associated with a network flow solution are described below.

Node Mass Balance

The node mass balance stipulates that the total mass flow leaving a particular node is equal to the total mass flow entering that node.

$$d_n + \sum_{j|(n,j) \in A_{in}} q_j = \sum_{j|(n,j) \in A_{out}} q_j + s_n$$

The left-hand side of the equation represents the flow leaving a node, as $d_n$ is the customer demand associated with the node. The term $\Sigma_{j|(n,j)\in A_{in}} q_j$ represents the flow associated with pipes whose "inlet" side is connected to the node. If the flow $q_j$ is positive, then it represents a flow leaving the node. The right-hand side of the equation represents the flow entering a node, as $s_n$ is the plant supply associated with the node. The term $\Sigma_{j|(n,j)\in A_{out}} q_j$ represents the flow associated with pipe segments whose "outlet" side is connected to the node. If the flow term $q_j$ is positive, then it represents a flow entering the node.

Node Pressure Continuity

The node pressure continuity equations require that the pressure at the pipe ends which is connected to a node should be the same as the pressure of the node.

$$p_j^{in} = p_n^{node} \forall (n,j) \in A_{in}$$

$$p_j^{out} = p_n^{node} \forall (n,j) \in A_{out}$$

Pipe Pressure Drop

The relationship between the flow of a gas in the pipe is nonlinear. A commonly used equation representing the nonlinear pressure drop relationship for gas pipelines is presented here. Other nonlinear relationships may be used in connection with alternative embodiments of the present invention.

This nonlinear pressure drop equation for gases in cylindrical pipelines is derived based on two assumptions. First, it is assumed that the gas in the pipeline network is isothermal (the same temperature throughout). This is a reasonable assumption because pipelines are often buried underground and there is excellent heat transfer between the pipeline and the ground. Under the isothermal assumption, an energy balance on the gas in the pipeline yields the following equation:

$$(p_j^{in})^2 - (p_j^{out})^2 = q_j|q_j|\frac{4ZRT}{M_w \pi^2 D_j^4}\left[\frac{4f_j L_j}{D_j} + 2\ln\left(\frac{p_j^{in}}{p_j^{out}}\right)\right]$$

For gas pipelines, because the pipe lengths are large relative to the diameters, the term $$\frac{4f_j L_j}{D_j}$$

is so much greater than the term $$2\ln\left(\frac{p_j^{in}}{p_j^{out}}\right)$$

that the latter term can be neglected.
Under this assumption, then the nonlinear pressure drop relationship reduces to:

$$(p_j^{in})^2 - (p_j^{out})^2 = \alpha q_j|q_j|$$

with $$\alpha = \frac{16 Z R f_j T_{ref} L_j}{M_w \pi^2 D_j^5}$$

where Z is the compressibility factor for the gas, which in most pipelines can be assumed to be a constant near 1; R is the universal gas constant; $T_{ref}$ is the reference temperature; $L_j$ is the length of the pipeline segment; and the term $f_j^e$ is a friction factor for a pipe segment, which varies weakly based on the Reynolds number of flow in the pipe, and for most gas pipelines is in the range 0.01-0.08. Below is provided an explicit formula for the friction factor in terms of the Reynold's number. The dimensionless Reynold's number is defined as $$Re_j = \frac{4|q_j|}{\pi D j \mu},$$

where $\mu$ is the gas viscosity.

If the flow is laminar ($Re_j^e < 2100$) then the friction factor is $$f_{j,L} = \frac{64}{Re_j}$$

If the flow is turbulent ($Re_j^e > 4000$), then the friction factor may be determined using the implicit Colebrook and White equation:

$$\frac{1}{\sqrt{f_{j,TR}}} = -2\log_{10}\left(\frac{\epsilon}{3.71 D} + \frac{2.51}{Re_j \sqrt{f_j}}\right).$$

An explicit expression for the friction factor for turbulent flow that is equivalent to the Colebrook and White equation is $$f_{j,TR} = \frac{1}{[c[W_0(e^{a/bc}/bc)] - a/b]^2}$$

where $$a = \frac{\epsilon}{3.71\, D}, \, b = \frac{2.51}{Re}, \text{ and } c = \frac{2}{\ln(10)} = 0.868589$$

and $W_0(\cdot)$ is the principal Lambert-W function. See (More, A. A. (2006). Analytical solutions for the Colebrook and White equation and for pressure drop in ideal gas flow in pipes. *Chemical engineering science*, 61(16), 5515-5519) and (Brkic, D. (2009). Lambert W-function in hydraulics problems. In *MASSEE International Congress on Mathematics MICOM, Ohrid.*)

When the Reynolds number is between 2100 and 4000, the flow is in a transition range between laminar and turbulent flow and the accepted approach in the literature is to interpolate the friction factor between the laminar and the turbulent value, based on the Reynolds number, as follows:

$$f_{j,TS} = f_{j,L|2100}\beta + f_{j,TF|4000}(1-\beta)$$

with $\beta = (4000 - Re_j)/(4000 - 2100)$.

Calculating Whether it is Hydraulically Feasible to Supply Additional Product to a Customer A key enabler for controlling a gas pipeline network to increase its capacity factor is to determine whether it is hydraulically feasible to supply an increased flow rate of the gas to customer n, the increased flow rate being as much as $\Delta_n$ greater than the current flow rate of gas to the customer.

Because the relationship between pressure drop and flow is highly nonlinear, and because it is an NP-complete problem to determine the feasibility of supplying additional product in a gas pipeline network using this nonlinear pressure drop relationship, described is a method for determining the hydraulic feasibility of supplying additional product using a linearized pressure drop model.

Figure 2:
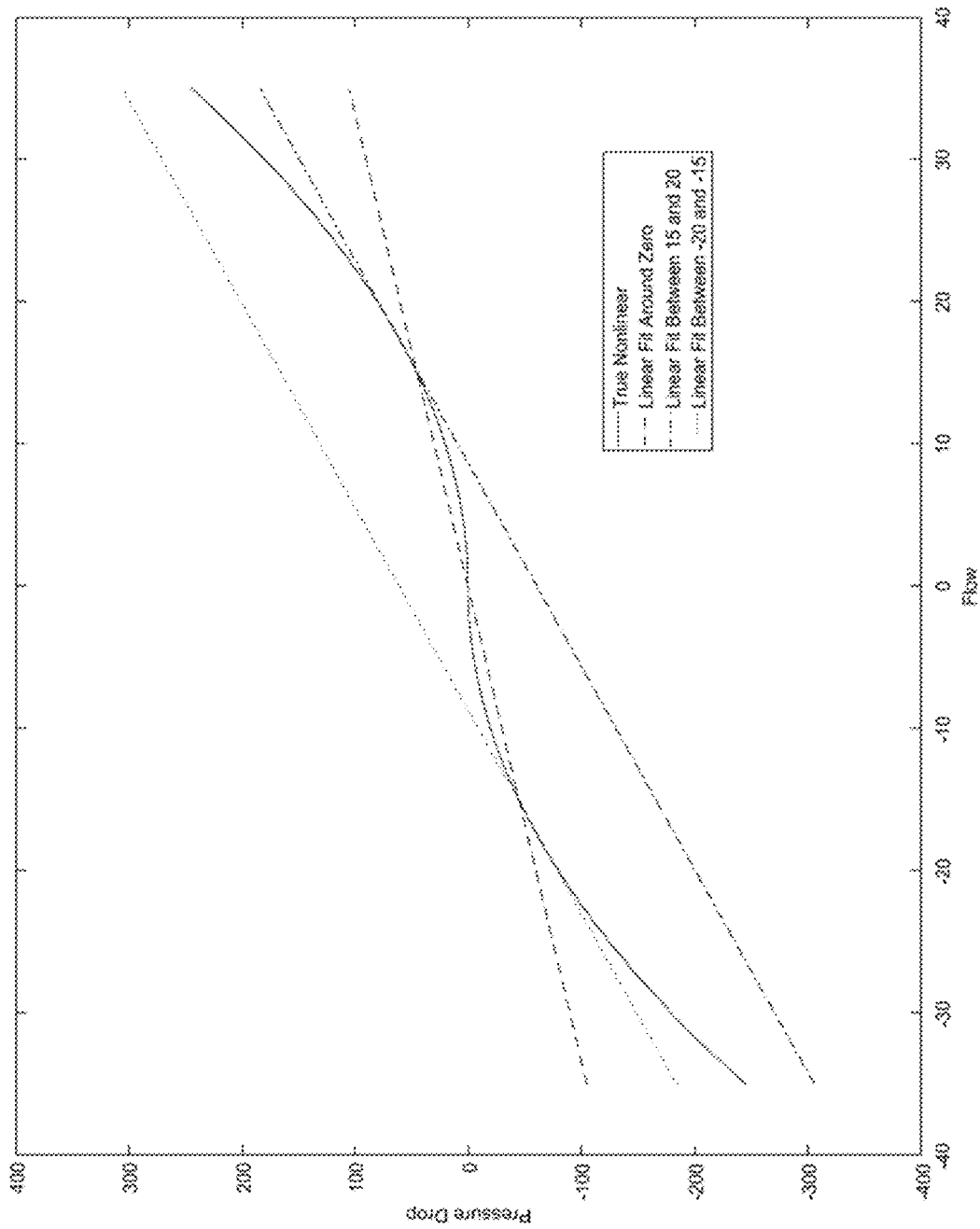
FIG. 2 shows the nonlinearity of the relationship between pressure drop and flow.

FIG. 2 illustrates the nonlinear relationship between pressure drop and flow. The true nonlinear relationship is indicated by the solid line. If one approximates the true nonlinear relationship with a linear fit centered around zero, the linear fit severely underestimates the pressure drop for flow magnitudes exceeding 20. If one does a linear fit of the true pressure drop relationship in the range of flows between 15 and 20, the quality of the pressure drop estimate for negative flows is very poor. If one does a linear fit of the true pressure drop relationship in the range between −20 and −15 MMSCFD, the pressure drop estimate for positive flows is very poor.

To produce an accurate linearization of the pressure drop relationship for pipe segments, it is critical to bound the range of flow rates for each pipe segment. In examples below, a linearization based on tightly bounded flow rates is called a "tight linearization". But note that if a customer receives additional product, this could alter the flow rates in the pipeline network.

Bounds on flow rates for a range of flow scenarios can be determined using mass balances and bounds on production for plants and demands from customers, even in the absence of any assumptions about pressure constraints and pressure drop relationships.

One method for bounding flows in pipeline segments based on mass balances is to formulate and solve a number of linear programs. For each pipe segment, one linear program can be used to determine the minimum flow rate in that segment and another linear program can be used to determine the maximum flow rate in that segment.

An exemplary embodiment of the present invention involves a method of bounding the flow rate in pipeline segments, under a range of demand/supply scenarios including the scenario where customer n takes additional product in a quantity up to $\Delta_n$. The novel method is simple and computationally more efficient than the linear programming method.

For the pipe segment of interest (assumed to not be in a graph cycle), the pipeline network is bisected into two subgraphs at the pipe segment of interest: a "left" subgraph and a "right" subgraph associated with that pipe. Formally, the left subgraph $L_j$ associated with pipe j is the set of nodes and arcs that are connected with the inlet node of pipe j once the arc representing pipe j is removed from the network. Formally, the right subgraph $R_j$ associated with pipe j is the set of nodes and arcs that are connected with the outlet node of pipe j once the arc representing pipe j is removed from the network. Given the bisection of the flow network into a left subgraph and a right subgraph, it is then possible to calculate the minimum and maximum signed flow through pipe segment j, based on potential extremes in supply and demand imbalance in the left subgraph and the right subgraph.

To bound the flow rate in each pipeline segment, some quantities describing the imbalance between supply and demand are defined in the left and right subgraphs. The minimum undersupply in the left subgraph for pipe j is defined as $s_{L_j}^{min} = (\Sigma_{n \in L} s_n^{min}) - (\Sigma_{n \in L} d_n + \Delta_n)$. The minimum unmet demand in the right subgraph for pipe j is defined as $d_{R_j}^{min} = (\Sigma_{n \in R} d_n) - (\Sigma_{n \in R} s_n^{max})$. The maximum oversupply in the left subgraph for pipe j is defined as $s_L^{max} = (\Sigma_{n \in L} s_n^{max}) - (\Sigma_{n \in L} d_n)$. The maximum unmet demand in the right subgraph for pipe j is defined as $d_R^{max} = (\Sigma_{n \in R} d_n + \Delta_n) - (\Sigma_{n \in R} s_n^{min})$.

Given the definitions above, the minimum and maximum feasible signed flow in the pipe segment are given by:

$$q_j^{min} = \max\{s_{L_j}^{min}, d_{R_j}^{min}\},$$

$$q_j^{max} = \min\{s_{L_j}^{max}, d_{R_j}^{max}\},$$

The equation for $q_j^{min}$ indicates that this minimum (or most negative) rate is the maximum of the minimum undersupply in the left subgraph and the minimum unmet demand in the right subgraph. The equation for $q_j^{max}$ indicates that this maximum (or most positive) rate is the minimum of the maximum oversupply in the left subgraph and the maximum unmet demand in the right subgraph.

The equations in the previous paragraph for calculating $q_j^{min}$ and $q_j^{max}$ can be derived from the node mass balance relationship, as follows. The node mass balance relationship, which was previously introduced, is $$d_n + \sum_{j|(n,j) \in A_{in}} q_j = \sum_{j|(n,j) \in A_{out}} q_j + s_n.$$

Consider the left subgraph associated with pipe j. The left subgraph contains the node connected to the inlet of pipe j. Consider collapsing the entire left subgraph into the single node connected to the inlet of pipe j. Then, $$q_j^{in} = \sum_{n \in L_j} s_n - d_n$$

An upper bound for the inlet flow is $q_j^{in} \leq \Sigma_{n \in L_j} s_n^{max} - d_n$, and a lower bound for the inlet flow is $q_j^{in} \geq \Sigma_{n \in L_j} s_n^{min} - (d_n + \Delta_n)$. Similarly, an upper bound for the outlet flow is $q_j^{out} \leq \Sigma_{n \in R_j} (d_n + \Delta_n) - s_n^{min}$ and a lower bound is $q_j^{out} \geq \Sigma_{n \in R_j} d_n - s_n^{max}$.

At steady state, the pipe inlet flow equals the outlet flow and $$\sum_{n \in L_j} s_n^{min} - (d_n + \Delta_n) \leq \sum_{n \in R_j} d_n - s_n^{max} \leq q_j^{in} =$$

$$q_j^{out} = q_j \leq \sum_{n \in R_j} (d_n + \Delta_n) - s_n^{min} \leq \sum_{n \in L_j} s_n^{max} - d_n.$$

Equivalently, $$\max\left\{\sum_{n \in L_j} s_n^{min} - (d_n + \Delta_n), \sum_{n \in R_j} d_n - s_n^{max}\right\} \leq q_j^{in} =$$

-continued $$q_j^{out} = q_j \le \min\left\{\sum_{n \in R_j}(d_n + \Delta_n) - s_n^{min}, \sum_{n \in L_j} s_n^{max} - d_n\right\}$$

or $$q_j^{min} = \max\{s_{L_j}^{min}, d_{R_j}^{min}\} \le = q_j \le \min\{s_{L_j}^{max}, d_{R_j}^{max}\} = q_j^{max},$$

or $q_j^{min} = \max\{s_{L_j}^{min}, d_{R_j}^{min}\} \le = q_j \le \min\{s_{L_j}^{max}, d_{R_j}^{max}\} = q_j^{max}$, which completes the proof.

Figure 3:
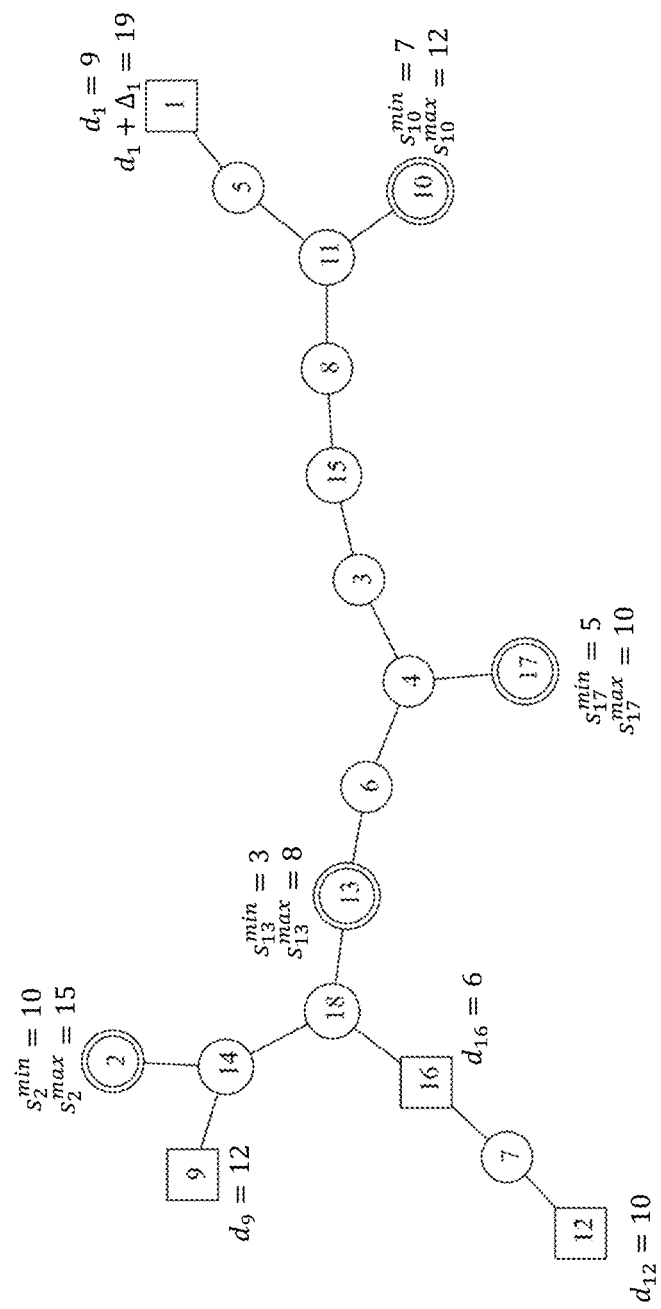
FIG. 3 represents an example pipeline network for illustrating method for bounding flow rates in pipe segments for the purpose of determining whether it is hydraulically feasible to offer additional product.

The bisection method for bounding flow rates in pipe segments is illustrated with an example. An example flow network is depicted in FIG. 3. This flow network has four customer demand nodes (nodes 1, 9, 12, and 16), and four plant supply nodes (nodes 2, 10, 13, and 17). This particular example relates to determining whether it is hydraulically feasible to supply additional product to the customer located at node 1. In this case, the current flow rate of the industrial gas to the customer at node 1 is 9 kg/s. It is determined whether it is possible to supply up to an additional 10 kg/s of gas flow rate, for a new total of 19 kg/s.

Figure 4:
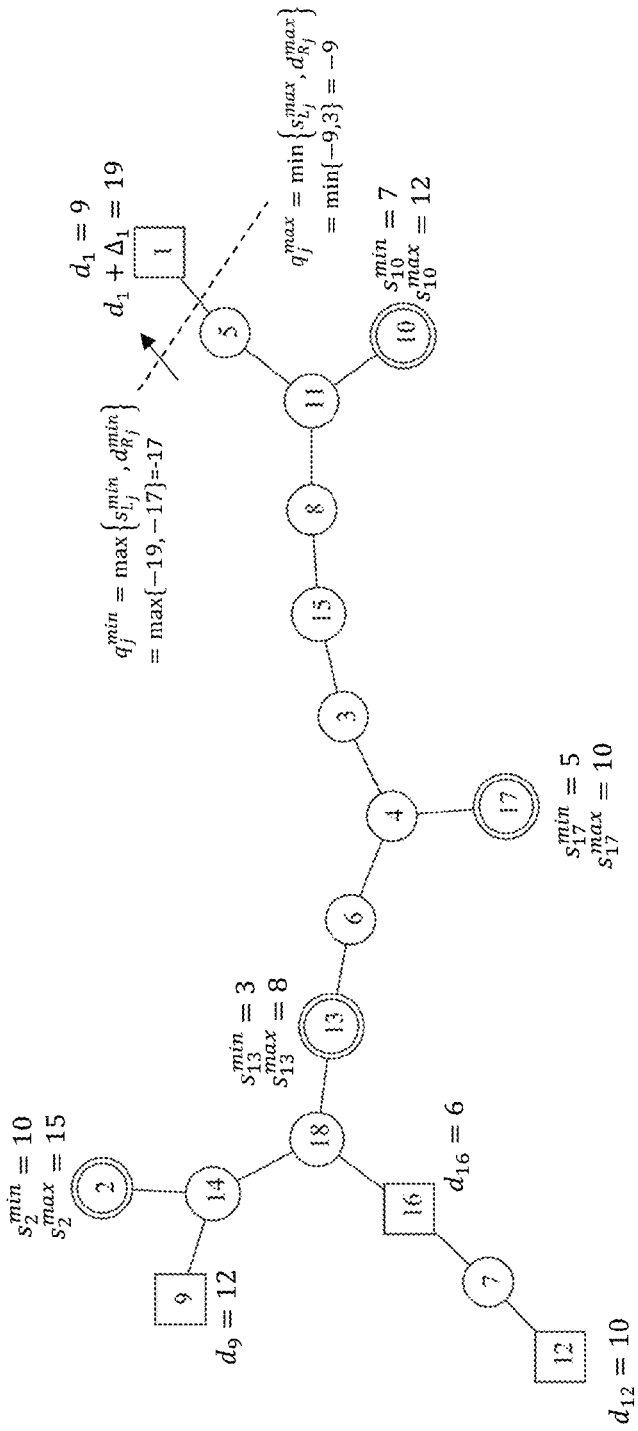
FIG. 4 is a first example illustrating the bisection method for bounding flows in pipes.

In FIG. 4, bounding the flow rate in the pipe going from node 5 to the customer at node 1 is illustrated. Per the indicated sign convention, a flow rate is negative if flow is in the direction leading from a higher-numbered node to a lower number node. The results of the bisection method indicate that the minimum signed flow rate in this pipe is −17 kg/s (corresponding to a flow of 17 kg/s to the customer at node 1), whereas the maximum signed flow rate in this pipe is −9 kg/s (corresponding to a flow of 9 kg/s to the customer at node 1). Thus, given plant production constraints and demand elsewhere in the network, we can only supply between 9 and 17 kg/s to the customer at node 1. This is less than the 19 kg/s originally envisioned, but is still significantly more than the current rate of 9 kg/s.

Figure 5:
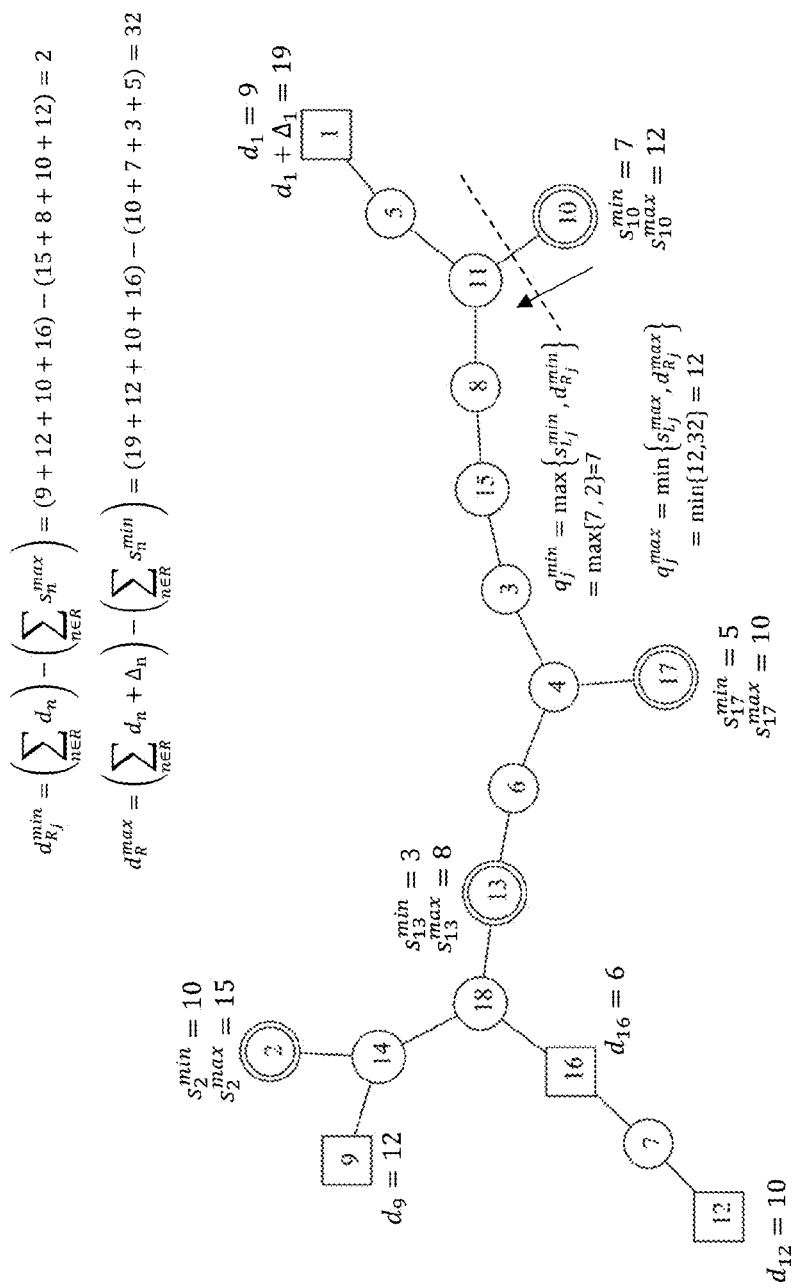
FIG. 5 is a second example of the bisection method for bounding flows in pipes.

In FIG. 5, bounding the flow rate in the pipe going from the plant at node 10 to the junction at node 11 is illustrated. The results indicate that the minimum and maximum flows in this pipe are 7 kg/s and 12 kg/s, respectively, which is exactly consistent with the minimum and maximum production rate of the plant at node 10.

Figure 6:
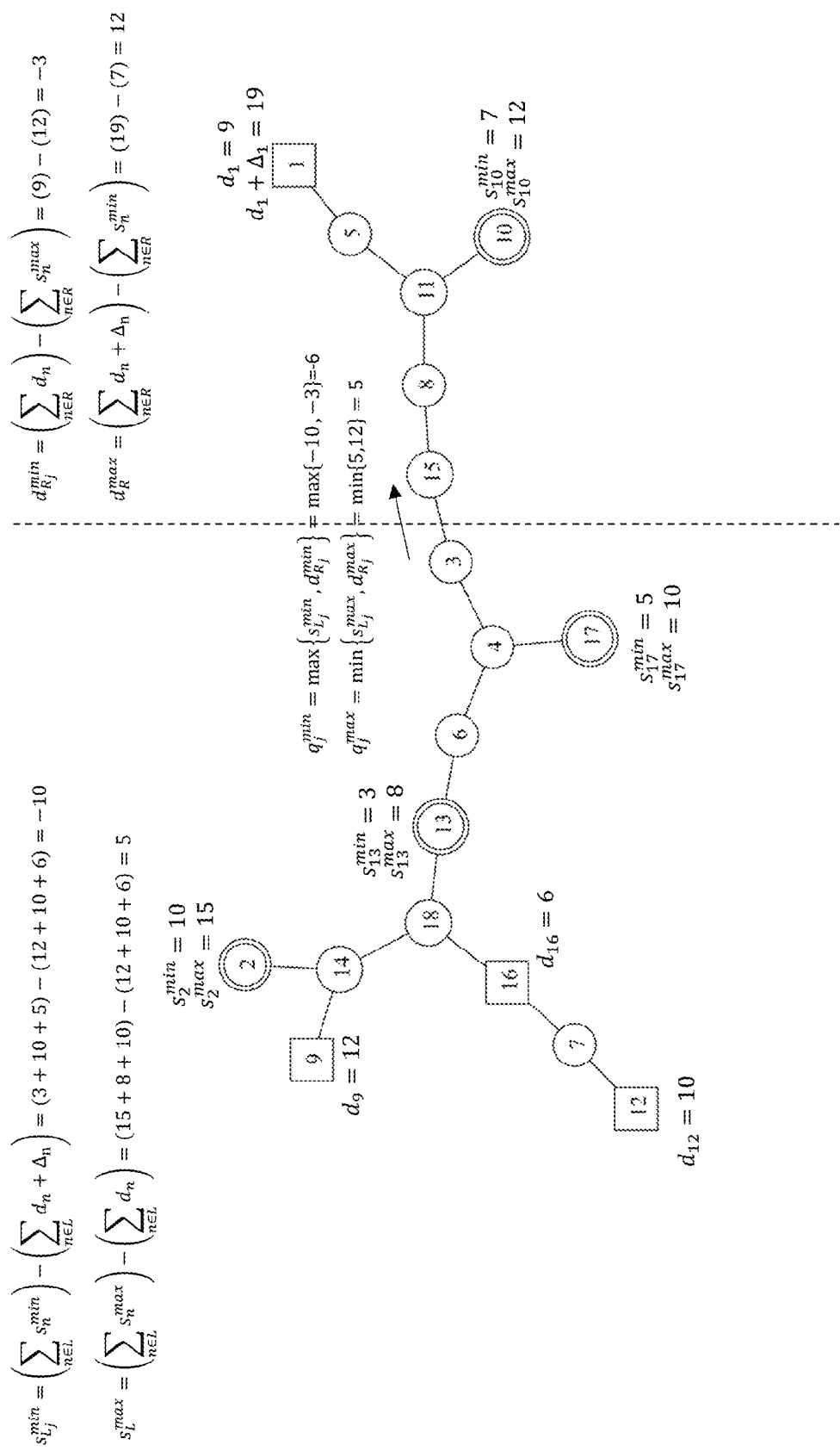
FIG. 6 is a third example of the bisection method for bounding flows in pipes.

In FIG. 6, bounding the flow rate in the pipe going from node 3 to node 15 is illustrated. The results indicate that the minimum and maximum signed flows in this pipe are −6 kg/s and 5 kg/s, respectively. This indicates that flow can potentially go in either direction in this pipe.

Figure 7:
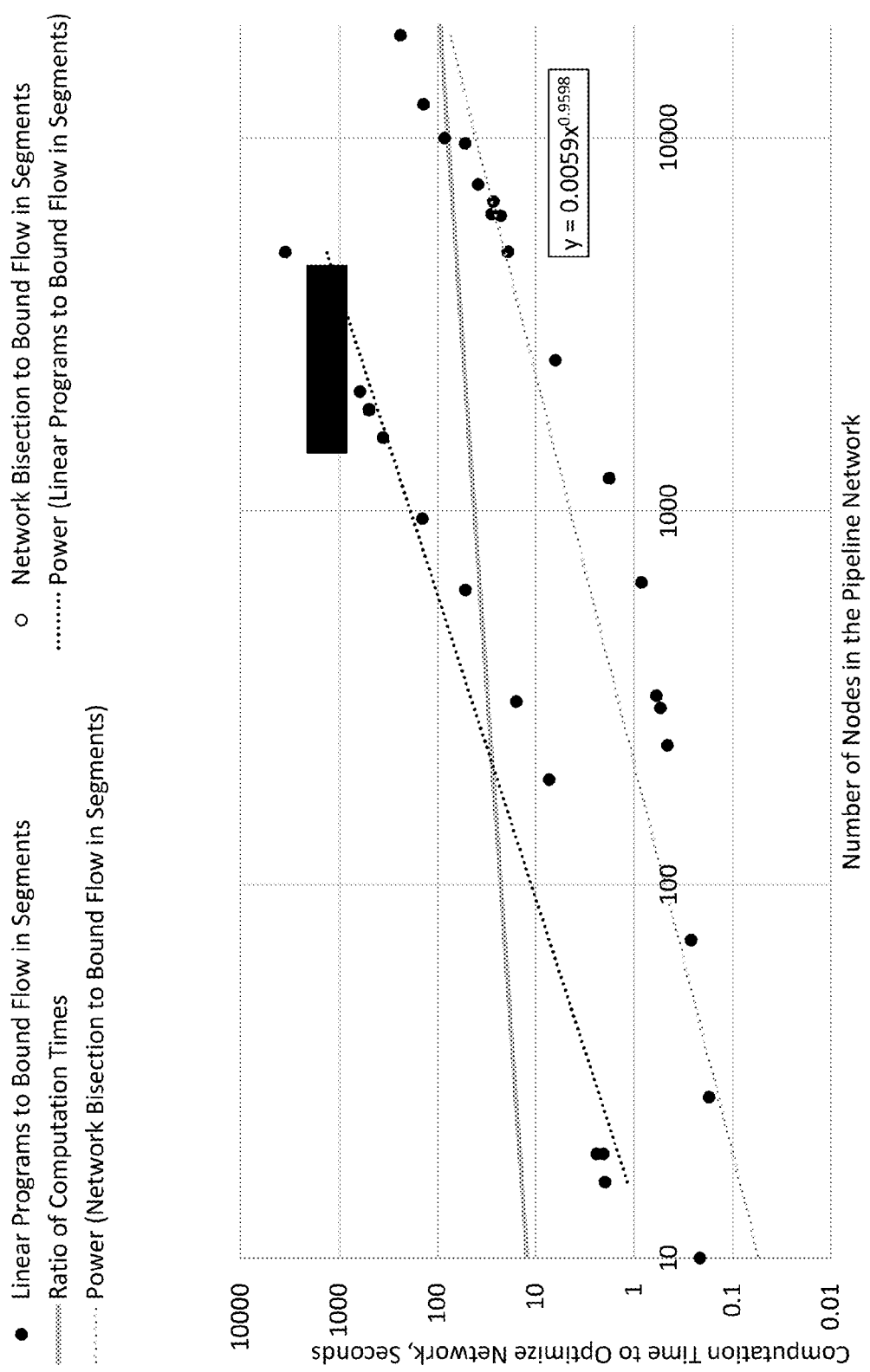
FIG. 7 shows a comparison of the computation times for two different methods for bounding flow in pipe segments.

FIG. 7, which shows data from computational experiments performed using Matlab on a computer with an Intel Core I 2.80 GHz processor, shows that the network bisection method for bounding the flow in pipeline segments is between 10 and 100 times faster than the linear programming method.

Finding the Best Linear Pressure-Drop Model Given a Scenario of Increased Customer Flow The next step in assessing the hydraulic feasibility of providing additional flow to a customer is to linearize the nonlinear pressure drop relationship for each pipe, based on the flow bounds established for each pipe. This can be done analytically (if the bounded flow range is narrow enough that the friction factor can be assumed to be constant over the flow range), or numerically (if the bounded flow range is sufficiently wide that the friction factor varies significantly over the flow range). The sections below describe how a linearization can be accomplished either analytically or numerically. A linear pressure drop model is sought of the form $$ps_j^{in} - ps_j^{out} = m_j q_j + b_j \,\forall j \in P.$$

Note that the fact that the flow range is bounded is critical to produce a good linear model. Without these bounds, a naïve linear model may be produced which is based on linearizing the nonlinear relationship about zero with a minimum and maximum flow magnitude equal to the total network demand. As will be shown in examples below, this generally does not produce good network flow solutions.

Finding the Least-Squares Linear Pressure-Drop Model Analytically: Slope-Intercept Form If the bounded flow range is fairly narrow, then the friction factor as well as the nonlinear pressure drop coefficient α will be nearly constant and an analytical solution may be found for the least squares linear fit of the nonlinear pressure drop relationship.

Least squares solution for a linear model with $g = q_j^{min}$ and $h = q_j^{max}$ $$(m_j^*, b_j^*) = \underset{m,b}{\mathrm{argmin}} \int_g^h (\alpha q|q| - mq - b)^2 dq$$

Evaluating the definite integral:

$$\int_g^h (\alpha q|q| - mq - b)^2 dq = b^2 h - b^2 g -$$
$$g^3\left(\frac{m^2}{3} - \frac{2\alpha b \mathrm{sign}(g)}{3}\right) + h^3\left(\frac{m^2}{3} - \frac{2\alpha b \mathrm{sign}(h)}{3}\right) - \frac{\alpha^2 g^5 \mathrm{sign}(g)^2}{5} +$$
$$\frac{\alpha^2 h^5 \mathrm{sign}(h)^2}{5} - bg^2 m + bh^2 m + \frac{\alpha g^4 m \mathrm{sign}(g)}{2} - \frac{\alpha h^4 m \mathrm{sign}(h)}{2}$$

This quantity is minimized when the partial derivatives with respect to b and m are simultaneously zero. These partial derivatives are $$\frac{\partial \int_g^h (\alpha q|q| - mq - b)^2 dq}{\partial b} =$$
$$2bh - 2bg - g^2 m + h^2 m + \frac{2\alpha g^3 \mathrm{sign}(g)}{3} - \frac{2\alpha h^3 \mathrm{sign}(h)}{3}$$

$$\frac{\partial \int_g^h (\alpha q|q| - mq - b)^2 dq}{\partial m} =$$
$$bh^2 - bg^2 - \frac{2g^2 m}{3} + \frac{2h^2 m}{3} + \frac{\alpha g^4 \mathrm{sign}(g)}{2} - \frac{\alpha h^4 \mathrm{sign}(h)}{2}$$

Setting the partial derivatives equal to zero, and solving for b and m, it is found that the form of the slope-intercept least squares linear model is:

$$b^* = -\frac{(\alpha g^5 \mathrm{sign}(g) - \alpha h^5 \mathrm{sign}(h) - 8\alpha g^3 h^2 \mathrm{sign}(g) + 8\alpha g^2 h^3 \mathrm{sign}(h) + \alpha g^4 h \mathrm{sign}(g) - \alpha g h^4 \mathrm{sign}(h))}{(6(g-h)(g^2 - 2gh + h^2))}$$

-continued $$m^* = \frac{(\alpha g^4 \text{sign}(g) - \alpha h^4 \text{sign}(h) - 2\alpha g^3 h \text{sign}(g) + 2\alpha g h^3 \text{sign}(h))}{(g^3 - 3g^2 h + 3gh^2 - h^3)}$$

Finding the Least Squares Model Empirically: Slope-Intercept Model

If the bounded flow range for a pipe segments spans more than a factor of two, then the friction factor may vary significantly over that flow range and there is no analytical expression for the least-squares linear fit of the nonlinear pressure drop relationship. In this case, the preferred approach for developing a least-squares linear fit of the nonlinear pressure drop is a numerical approach.

This approach entails using numerical linear algebra to calculate the value of the slope and intercept using the formula.

$$\begin{bmatrix} m \\ b \end{bmatrix} = (Q^T Q)^{-1} Q^T y$$

where m is the slope of the line, b is the intercept of the line, Q is a matrix the first column of the matrix Q contains a vector of flow rates ranging from the minimum signed flow rate for the segment to the maximum signed flow rate for the segment, and the second column is a vector of ones.

$$Q = \begin{bmatrix} q_{min} & 1 \\ \vdots & \vdots \\ q_{max} & 1 \end{bmatrix}$$

The vector y contains the pressure drop as calculated by the nonlinear pressure drop relationship, at flow rates ranging from the minimum signed flow rate to the maximum signed flow rate. Since the friction factor varies over this flow range, a different value of the nonlinear pressure drop relationship a may be associated with each row of the vector.

$$y = \begin{bmatrix} \alpha_{min} q_{min} |q_{min}| \\ \vdots \\ \alpha_{max} q_{max} |q_{max}| \end{bmatrix}$$

As an example, consider the following data from a nonlinear pressure drop model:

| Flow, kg/s | Change in squared pressure, Pa² |
|---|---|
| 2.0 | 7.7 |
| 3.0 | 12.1 |
| 4.0 | 17.9 |
| 5.0 | 25.3 |
| 6.0 | 34.1 |
| 7.0 | 44.3 |

Given this data, $$q_{min} = 2.0, \; q_{max} = 7.0, \; Q = \begin{bmatrix} 2.0 & 1 \\ 3.0 & 1 \\ 4.0 & 1 \\ 5.0 & 1 \\ 6.0 & 1 \\ 7.0 & 1 \end{bmatrix},$$

and $$y = \begin{bmatrix} 7.7 \\ 12.1 \\ 17.9 \\ 25.3 \\ 34.1 \\ 44.3 \end{bmatrix}.$$

Applying the formula $$\begin{bmatrix} m \\ b \end{bmatrix} = (Q^T Q)^{-1} Q^T y,$$

it is determined that the parameters of the least-squares linear fit are m=7.33 and b=−9.40.

Finding the Least Squares Model Numerically: A Slope Only Model

In some instances, If the flow range includes transition turbulent flow, includes laminar flow, or includes both turbulent and laminar flow regimes, there is no analytical expression for the least-squares linear fit of the nonlinear pressure drop relationship. In this case, the preferred approach for developing a least-squares linear fit of the nonlinear pressure drop is a numerical approach.

This approach involves calculating the value of the $$m = (q^T q)^{-1} q^T y$$

where m is the slope of the line, q is a vector of flow rate values ranging from the minimum signed flow rate for the segment to the maximum signed flow rate for the segment $$q = \begin{bmatrix} q_{min} \\ \vdots \\ q_{max} \end{bmatrix}$$

The vector y contains the pressure drop as calculated by the nonlinear pressure drop relationship, at flow rates ranging from the minimum signed flow rate to the maximum signed flow rate. Since the friction factor varies over this flow range, a different value of the nonlinear pressure drop relationship a may be associated with each row of the $$\text{vector } y = \begin{bmatrix} \alpha_{min} q_{min} |q_{min}| \\ \vdots \\ \alpha_{max} q_{max} |q_{max}| \end{bmatrix}.$$

As an example, consider the following data from a nonlinear pressure drop model:

| Flow, kg/s | Change in squared pressure, Pa² |
|---|---|
| −3.0 | −24.2 |
| −2.0 | −7.5 |
| −1.0 | −1.0 |
| 0.0 | 0.0 |
| 1.0 | 1.0 |
| 2.0 | 7.5 |

Given this data, $$q_{min} = 2.0, q_{max} = 7.0, q = \begin{bmatrix} -3.0 \\ -2.0 \\ -1.0 \\ 0.0 \\ 1.0 \\ 2.0 \end{bmatrix},$$

and $$y = \begin{bmatrix} -24.2 \\ -7.5 \\ -1.0 \\ 0.0 \\ 1.0 \\ 7.5 \end{bmatrix}.$$

Applying the formula $m=(q^T q)^{-1} q^T y$, it is determined that the parameter of the least-squares linear fit is m=5.51.

Choosing the Most Appropriate Linear Model

Described herein are several methods for calculating the best linear fit of the nonlinear pressure drop relationship, given the minimum and maximum flow rates in each pipe segment under a range of scenarios including those in which one or more customers is supplied with an increased flow rate. Also, described is how to find the best slope-only linear model, given the minimum and maximum flow rates. An open question is in which situations it is appropriate to use the slope/intercept model, and in which situations it is best to use the slope-only model. A key principle here is that the linear model should always give the correct sign for the pressure drop. In other words, for any linear model exercised over a bounded flow range, the sign of the predicted pressure drop should be consistent with the flow direction. Pressure should decrease in the direction of the flow. Note that the slope-only model has an intercept of zero, and thus the slope-only model will show sign-consistency regardless of the flow range. So, a slope-intercept model should be used unless there is a point in the allowable flow range where there would be a sign inconsistency; if a slope-intercept model would create a sign-inconsistency, then the slope-only model should be used.

Bounding the Error in the Linearized Pressure Predictions for the Pipeline Network Above described is how to linearize the pressure drop relationship for each pipe in the network by first bounding the range of flow rates which will be encountered in each pipe segment. In accordance with embodiments of the invention, the linearized pressure drop models are used to determine whether it is hydraulically feasible to supply an increased flow of gas to a customer. Although the linearized pressure drop models fit the nonlinear models as well as possible, there will still be some error in the pressure estimates in the network flow solution relative to the pressures that would actually exist in the network given the flows from the network flow solution and the true nonlinear pressure drop relationships. To accommodate this error while still ensuring that pressure constraints are satisfied by the network flow solution, it is necessary to bound the error in the linearized pressure prediction at each node in the network.

To bound the error in the pressure prediction at each node in the network, first, the error in the prediction of the pressure drop for each arc is bound. For pipe arcs, this is done by finding the maximum absolute difference between the linear pressure drop model and the nonlinear pressure drop model in the bounded range of flows for the pipe segment. By definition, $$ps_j^{err} = \max_{q_j^{min} \leq q \leq q_j^{max}} |\alpha_j q|q| - m_j^* q - b_j^*| \forall\ j \in P.$$

For control arcs, the maximum error in the prediction of the change in pressure associated with the arc depends on the type of arc. Some control elements, such as valves in parallel with variable speed compressors, have the capability to arbitrarily change the pressure and flow of the fluid within certain ranges, and for these there is no error in the pressure prediction. Other types of control elements, such as nonlinear valves, may be represented by a linear relationship between pressure drop and flow based on the set valve position. For these, there may be a potential linearization error similar to that for pipes. In what follows, it is assumed without loss of generality that $ps_j^{err}=0 \forall j \in C$.

Next, a known reference node r in the network is identified. This is a node where the pressure is known with some bounded error. Typically, the reference node is a node which is incident from a pressure control element arc. The maximum absolute pressure error for the reference value can be set to zero, or it can be set to some small value associated with the pressure tracking error associated with the pressure control element.

To compute the error associated with nodes in the network other than the reference node, the undirected graph representing the pipeline network is converted to a weighted graph, where the weight associated with each pipeline arc is the maximum absolute pressure error for the pipe segment. The shortest path is then found, in the weighted graph, between the reference node and any other target node.

In a shortest-path problem, given is a weighted, directed graph G=(N,A), with weight function w: A→R mapping arcs to real-valued weights. The weight of path p=<n₀, n₁, . . . , n_k> is the sum of the weights of its constituent arcs:

$$w(p) = \sum_{i=1}^{k} w(n_{i-1}, n_i).$$

The shortest-path weight from n to m is defined by $$\delta(m, n) = \begin{cases} \min\{w(p): m \xrightarrow{p} n\} & \text{if there is a path from } m \text{ to } n \\ \infty & \text{otherwise} \end{cases},$$

A shortest-path from node m to node n is then defined as any path p with weight $w(p)=\delta(m,n)$.

In the weighted graph used here, the weight function is the maximum absolute pressure prediction error associated with the pipe segment connecting the two nodes. To compute the shortest-path weight $\delta(m,n)$, an implementation of Dijkstra's algorithm can be used (see Ahuja, R. K., Magnanti, T. L., & Orlin, J. B. (1993). Network flows: theory, algorithms, and applications.) The maximum pressure error for the target node is the maximum pressure error for the reference node plus the shortest path distance between the reference node and the target node. In mathematical notation, $$ps_m^{err} = ps_r^{err} + \delta(r,m)$$

where the weight function for the shortest path is $w_j = ps_j^{err}$.

If a pipeline network has more than one pressure reference node $r_1, \ldots, r_n$, then one calculates the shortest path between each reference node and every other reference node. The pressure error is then bounded by the minimum of the quantity $ps_r^{err} + \delta(r,m)$ over all reference nodes:

$$ps_m^{err} = \min_{r \in \{r_1, \ldots, r_n\}} \{ps_r^{err} + \delta(r,m)\}.$$

Determining Whether it is Hydraulically Feasible to Supply an Increased Flow Rate to a Customer Described herein is a method for analyzing a scenario where a customer receives additional product by 1) bounding the minimum and maximum flow rate for each pipe segment in a computationally efficient fashion; 2) computing an accurate linear approximation of the nonlinear pressure drop relationship given the bounded flow range; 3) bounding the pressure prediction error associated with the linear approximation. Now it can be determined whether it is hydraulically feasible to supply additional product to a customer, that is, to determine whether there is an increased flow scenario which 1) satisfies constraints associated with the conservation of mass and momentum; 2) is consistent with bounds on the flow delivered to each customer, 3) satisfies pipeline pressure constraints with appropriate margin to accommodate errors associated with the linearization of the nonlinear pressure drop relationship. The governing equations are summarized here. Node mass balance The node mass balance stipulates that the total mass flow leaving a particular node is equal to the total mass flow entering that node.

$$d_n + \sum_{j|(n,j) \in A_{in}} q_j = \sum_{j|(n,j) \in A_{out}} q_j + s_n$$

Node Pressure Continuity

The node pressure continuity equations require that the pressure of all pipes connected to a node should be the same as the pressure of the node.

$$ps_j^{in} = ps_n^{node} \forall (n,j) \in A_{in}$$

$$ps_j^{out} = ps_n^{node} \forall (n,j) \in A_{out}$$

Linearized Pressure Drop Mode

We have shown how to develop a linear pressure drop model of the form $$ps_j^{in} - ps_j^{out} = m_j q_j + b_j.$$

Pressure Constraints at Nodes

At nodes in the pipeline network, there are minimum and maximum pressure constraints. These constraints must be satisfied with sufficient margin, namely $ps_n^{err}$, to allow for potential inaccuracy associated with the linearized pressure drop relationships:

$$ps_n^{min} + ps_n^{err} \leq ps_n^{node} \leq ps_n^{max} - ps_n^{err}, \forall n \in N.$$

This ensures that the pressures constraints will be satisfied even when the nonlinear pressure drop model is used to calculate network pressures based on the flow values associated with the network flow solution. Above, we have shown how to compute $ps_n^{err}$ using Dijkstra's algorithm for a certain weighted graph.

Production Constraints

This constraint specifies the minimum and maximum production rate for each of the plants.

$$s_n^{min} < s_n < s_n^{max}$$

The governing equations can be combined to formulate the following linear program to determine the maximum flow rate of a gas that can be supplied to customer k.

| GIVEN | |
| --- | --- |
| $d_n^{cur} \forall n \in N$ | Current customer demand rate in node n |
| $(m_j, b_j) \forall j \in P$ | Linearized pressure drop model for pipe j |
| $ps_n^{err} \forall n \in N$ | Maximum squared pressure error for node n, given linearized pressure drop models |
| $s_n^{min} < s_n < s_n^{max}$ | Minimum and maximum production rates at node n |
| CALCULATE | |
| $q_j \forall j \in A$ | Flow rate in arcs |
| $s_n \forall n \in S$ | Production rate in supply node |
| $d_n \forall n \in D$ | Updated rate supplied to customers |
| $ps_n^{node} \forall n \in N$ | Squared pressure at each node |
| $ps_j^e \forall j \in A$ | Squared pressure at the ends of each arc |
| IN ORDER TO MAXIMIZE | |
| $d_k$ | Maximum flow rate of gas which can be supplied to customer of interest |
| SUCH THAT | |
| $d_n + \Sigma_{j|(n,j) \in A_{in}} q_j = \Sigma_{j|(n,j) \in A_{out}} q_j + s_n \forall n \in N$ | Node mass balance |
| $ps_j^{in} = ps_n^{node} \forall (n,j) \in A_{in}$ | Node pressure equality constraints |
| $ps_j^{out} = ps_n^{node} \forall (n,j) \in A_{out}$ | Node pressure equality constraints |
| $ps_j^{in} - ps_j^{out} = m_j q_j + b_j \forall j \in P$ | Linearized pressure drop model for pipes |
| $ps_n^{min} + ps_n^{err} \leq ps_n^{node} \leq ps_n^{max} - ps_n^{err}, \forall n \in N$ | Pressure bounds with margin for error |
| $s_n^{min} < s_n < s_n^{max} \forall n \in S$ | Production bounds |
| $d_n^{cur} < d_n < d_n^{cur} + \Delta_n \forall n \in D$ | Demand bounds when one more customers accept additional product |

The above linear program can be quickly solved by a wide variety of linear programming solvers, including those in MATLAB, Gurobi, and CPLEX. Note that additional linear constraints, such as min or max flow rates in certain arcs, can easily be added to the above linear program. The primary result of the linear program, $d_k$, is the maximum flow rate to customer k that is hydraulically feasible. If this amount is significantly greater than the current flow rate of gas being supplied to the customer, then it is hydraulically feasible to offer an increased flow of gas to the customer.

Estimating Whether a Customer has Latent Demand for a Gas

Above described is a computationally efficient method to determine whether it is hydraulically feasible to supply an increased flow rate of a gas to a customer. In order to increase the capacity factor of a gas pipeline network, it is also important to determine whether a customer has latent demand for the gas. In order to efficiently increase the capacity factor of the gas pipeline network, it is important to have a means to automatically determine whether latent demand exists on a frequent and regular interval, without the need to query the customer.

Embodiments of the invention incorporate a classification tree which uses intrinsic and extrinsic factors to determine whether latent demand for the gas exists. A classification tree is a machine learning construct which uses certain features to predict an outcome. The classification tree can be represented as a binary tree, where the classification tree starts at the root of the tree. A series of binary decisions are made, based on the values of intrinsic and extrinsic factors available to the operator of the gas pipeline network.

A classification tree for whether there is latent demand for a gas may be generated automatically using historical data as to whether the customer accepted an increased flow rate of gas when it was offered to them.

Other machine learning models may be used within the scope of the present invention, such as a support vector machine.

Consider the example where the gas pipeline network is for the production, transmission, and distribution of hydrogen, and a customer for hydrogen gas is a petroleum refinery. The operator of the pipeline network may have information on intrinsic and extrinsic factors associated with latent demand for hydrogen. Examples of intrinsic factors affecting the latent demand for hydrogen are: 1) the change in consumption of hydrogen by the refinery over the past three hours, 2) time-of-day, 3) the crude slate for a particular refinery, 4) day of week, and 5) time since last call. Examples of extrinsic factors affecting the latent demand for hydrogen include 1) the retail price of gasoline, 2) the price of ultra-low diesel sulfur, 3) the rate of imports of petroleum for the region in which the refinery is located, 4) the price of natural gas, and 5) the spread between the prices of sweet and sour crude.

Figure 8:
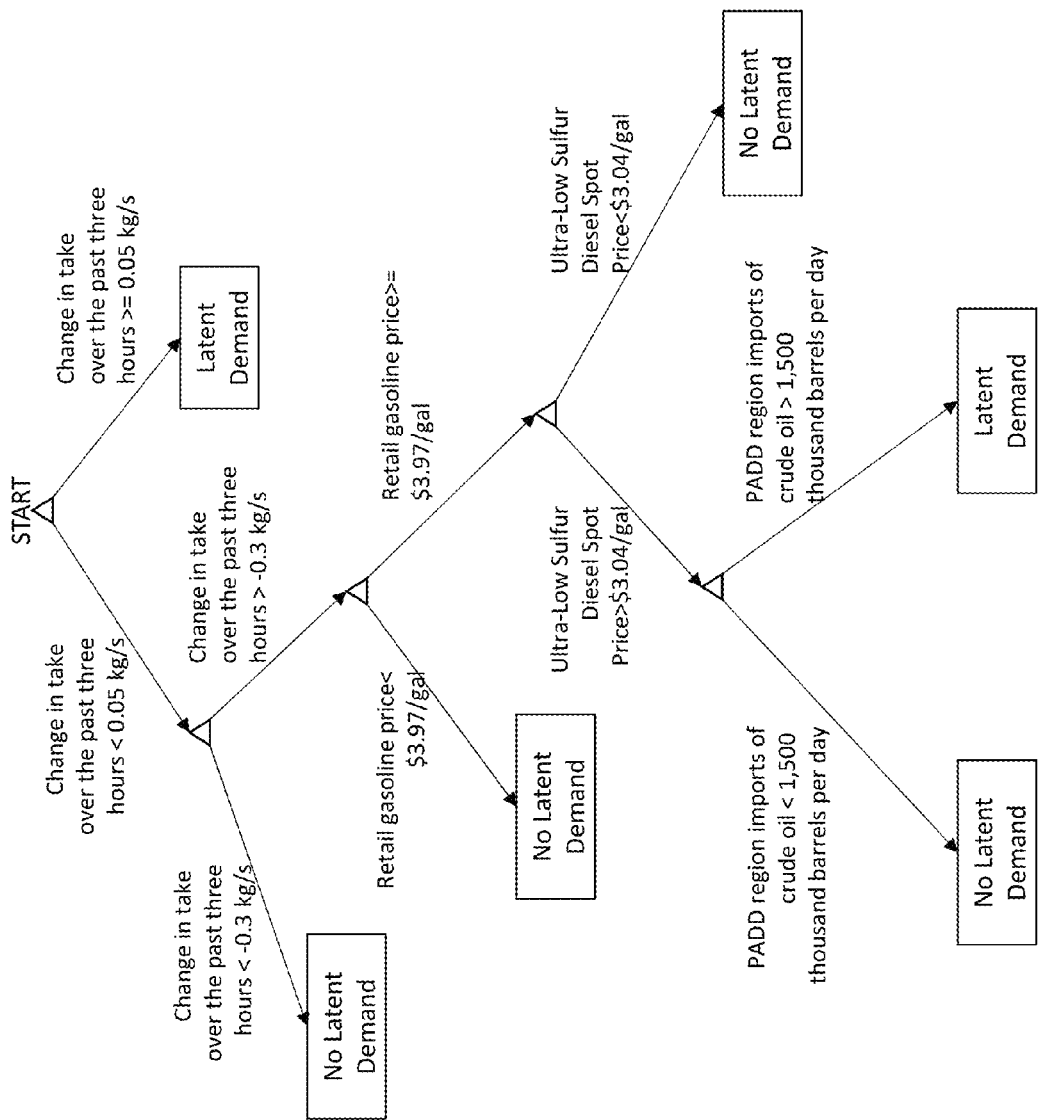
FIG. 8 is an example of a classification tree used to determine whether a customer has latent demand for hydrogen.

FIG. 8 is an example of a classification tree that might be used to determine whether or not a petroleum refinery has latent demand for hydrogen.

A variety of machine learning techniques, other than classification trees, may be used to estimate whether a customer has latent demand for an industrial gas. Other techniques that might be used include logistic regression, linear discriminant analysis, Fisher discriminant analysis, and support vector machines.

Receiving an Updated Request Rate for the Gas

If it is hydraulically feasible to supply an increased flow rate of gas to the customer, and it is estimated that the customer has latent demand for the gas, then an updated request rate is received from the customer. The updated request rate may be received telephonically, by email, or by other electronic means. Often, the updated request rate would be provided in response to an offer from the operator of the industrial gas network to provide an increased flow of the gas. Typically, the updated request rate would be for a certain flow rate of the gas which is as much as $\Delta_n$ units greater than the current rate. In describing how a network flow solution is calculated below, the newly updated request rate for customer n is represented by the variable $d_n$.

Calculating a Network Flow Solution Using an Updated Customer Request

After it has been determined that it is hydraulically feasible to provide an increased flow of the gas to a customer, and it has been estimated that the customer may have latent demand for the gas, and an updated request rate has been received, embodiments of the invention calculate a new network slow solution. The network flow solution is calculated using the linearized pressure drop models that were described above. Embodiments of the invention use a linear program as follows:

| GIVEN | |
|---|---|
| $d_n, \forall n \in d$ | Updated rate to be supplied to customers |
| $(m_j, b_j) \forall j \in P$ | Linearized pressure drop model for pipe j |
| $ps_n^{err} \forall n \in N$ | Maximum squared pressure error for node n, given linearized pressure drop models |
| $s_n^{min} < s_n < s_n^{max}$ | Minimum and maximum production rates at node n |
| CALCULATE | |
| $q_j \forall j \in A$ | Flow rate in arcs |
| $s_n \forall n \in S$ | Production rate in supply node |
| $ps_n^{node} \forall n \in N$ | Squared pressure at each node |
| $ps_j^e \forall j \in A$ | Squared pressure at the ends of each arc |
| SUCH THAT | |
| $d_n + \Sigma_{j\|(n,j)\in A_{in}} q_j = \Sigma_{j\|(n,j)\in A_{out}} q_j + s_n \ \forall n \in N$ | Note mass balance |
| $ps_j^{in} = ps_n^{node} \ \forall(n,j) \in A_{in}$ | Node pressure equality constraints |
| $ps_j^{out} = ps_n^{node} \ \forall(n,j) \in A_{out}$ | Node pressure equality constraints |
| $ps_j^{in} - ps_j^{out} = m_j q_j + b_j \ \forall j \in P$ | Linearized pressure drop model for pipes |
| $ps_n^{min} + ps_n^{err} \le ps_n^{node} \le ps_n^{max} - ps_n^{err}, \forall n \in N$ | Pressure bounds with margin for error |

The linear program may be solved using any of a variety of linear program solvers, including those found in Matlab, CPLEX, or Gurobi.

Controlling the Gas Pipeline Network Using the Network Flow Solution

Once the network flow solution has been computed, it can be used to control the gas pipeline network. Flow control elements receive setpoints which are identified using the network flow solution.

There are two representations of control elements in the undirected graph representation of the network. First, nodes associated with supply or demand are control elements, and the network flow solution indicates the supply or demand flow that should be associated with each plant or customer in the network. Second, in some networks there are also control arcs (representing compressors, valves, or a combination of compressors in valves). The network flow solution indicates the flows and pressures that should be accomplished by these control elements.

EXAMPLE 1

The invention is first illustrated with an example which is small enough that extensive detail can be provided. In this example, there are three customers and three plants. In the network diagram of FIG. 9, customers are represented as squares and plants are represented as double circles.

Parameters for each of the eight nodes in the network are shown in Table 1. For the customer demand nodes, the minimum acceptable pressure is 2 Pa (corresponding to a squared pressure of 4 Pa²). For the plant supply nodes, the maximum acceptable pressure is 5 Pa (corresponding to a squared pressure of 25 Pa²). The table shows that the demand for the customer at node 1 is 0.449 kg/s; the demand for the customer at node 4 is 0.208 kg/s; and the demand for the customer at node 6 is 1.06 kg/s. The table also shows that the gas production plant located at node 3 can range from 0 to 0.597 kg/s; the gas production plant located at node 5 can produce between 0.546 kg/s and 1.135 kg/s; and the gas production plant located at node 7 can produce between 0 and 0.530 kg/s.

the slope and intercept associated with the linearization of the nonlinear pressure drop relationship. Note that for some arcs, such as (2,4), (2,8), (3,4), and (7,8), there is slope-only line; whereas for the arcs (1,2), (2,5), and (2,6) there is a slope-intercept line.

TABLE 2

Parameters for the arcs for Example 1

| ID | L, m | D, m | α | $ps_j^{err}$, $Pa^2$ | $m_j$ | $b_j$ | $q_j$, kg/s |
|---|---|---|---|---|---|---|---|
| (1, 2) | 3983.2 | 0.153 | 0.3801 | 6.34E−06 | 0.338059 | 0.075155 | −0.44964 |
| (2, 4) | 3983.2 | 0.157 | 0.3322 | 0.014054 | 0.092901 | 0 | −0.12396 |
| (2, 5) | 571.2 | 0.125 | 0.1521 | 0.007734 | 0.261516 | 0.108553 | −0.89205 |
| (2, 6) | 378.0 | 0.125 | 0.1007 | 1.68E−06 | 0.215032 | −0.11484 | 1.06315 |
| (2, 8) | 3983.2 | 0.125 | 1.0606 | 0.074667 | 0.422114 | 0 | −0.49679 |
| (3, 4) | 1.6 | 0.158 | 0.0001 | 1.18E−05 | 5.99E−05 | 0 | 0.332423 |
| (7, 8) | 499.9 | 0.206 | 0.0108 | 0.000788 | 0.004399 | 0 | 0.496786 |

TABLE 1

Parameters for the nodes for Example 1

| n | $d_n$, kg/s | $s_n^{min}$, kg/s | $s_n^{max}$, kg/s | $ps_n^{min}$, $Pa_2$ | $ps_n^{max}$, $Pa^2$ | $ps_n^{err}$, $Pa^2$ |
|---|---|---|---|---|---|---|
| 1 | 0.449 | 0 | 0 | 4 | Inf | 0 |
| 2 | 0 | 0 | 0 | 0 | Inf | 6.34E−06 |
| 3 | 0 | 0 | 0.597 | 0 | 25 | 1.41E−02 |
| 4 | 0.208 | 0 | 0 | 4 | Inf | 0.014061 |
| 5 | 0 | 0.5461 | 1.135 | 0 | 25 | 0.00774 |
| 6 | 1.063 | 0 | 0 | 4 | Inf | 8.01E−06 |
| 7 | 0 | 0 | 0.530 | 0 | 25 | 7.55E−02 |
| 8 | 0 | 0 | 0 | 0 | Inf | 0.074674 |

Figure 9:
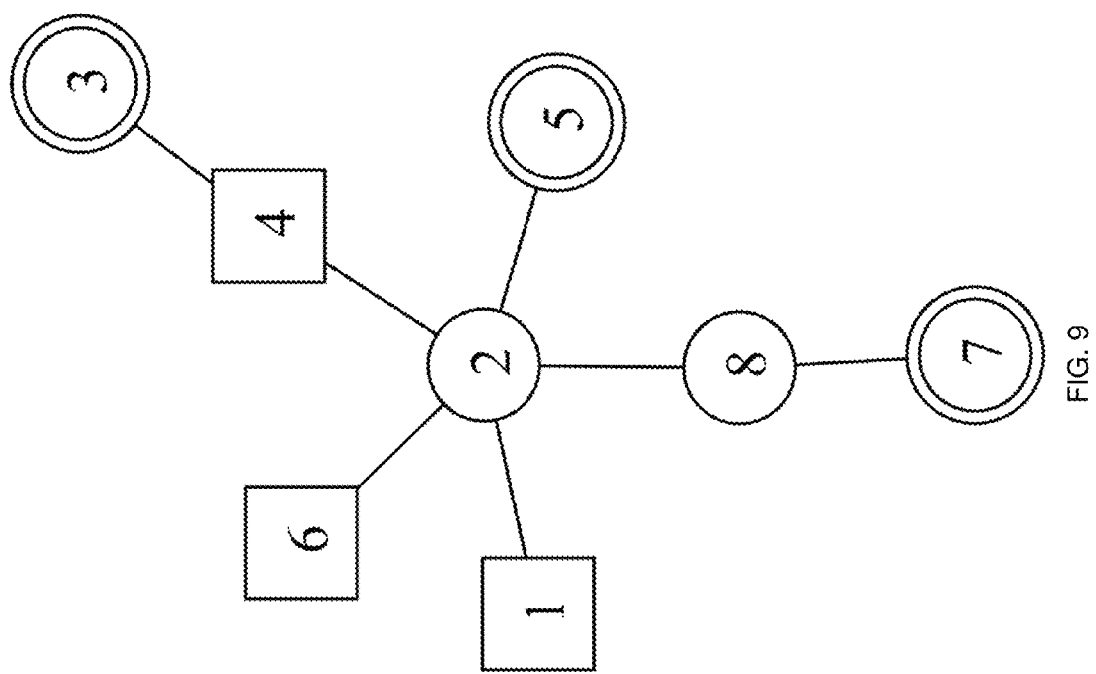
FIG. 9 is an unsigned graph representing an example of a gas pipeline network.
Figure 10:
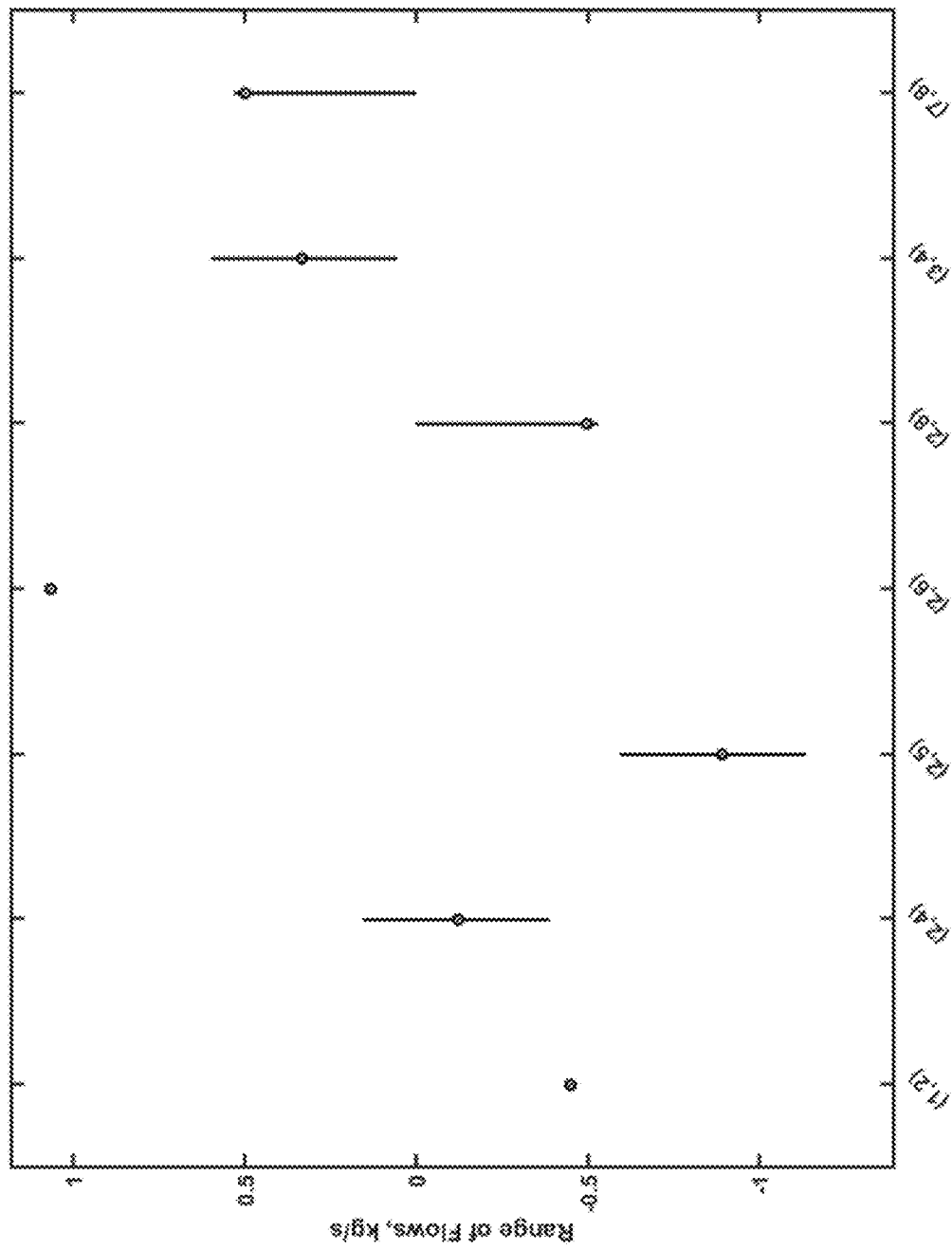
FIG. 10 shows bounds on the flow in each pipe segment.

The first step in the implementation of the invention is to bound the flow rate in each of the pipe segments, using the graph layout shown in FIG. 9, the information in Table 1, and the network bisection method described in great detail above. The results are shown in FIG. 10, which displays the range of possible flows for each arc in the graph. By convention, the "inlet" for each pipe is at the lower numbered node on which it is incident, and the "outlet" for each pipe is at the higher numbered node on which it is incident. As a result, by convention, flows are indicated as negative if the flow is going from a higher numbered node to a lower numbered node.

Note that FIG. 10 shows that the flow in arc (1,2) is −0.449 kg/s, and the flow in arc (2,6) is 1.063 kg/s, with no potential for any other flow value. This is because node 1 is a customer demand node of degree 1, with a customer with demand 0.449 kg/s; and node 6 is a customer demand node of degree 1, with a customer demand of 1.063 kg/s. For all other arcs in the network, there is a potential range of flows indicated by the vertical bar.

Figure 11:
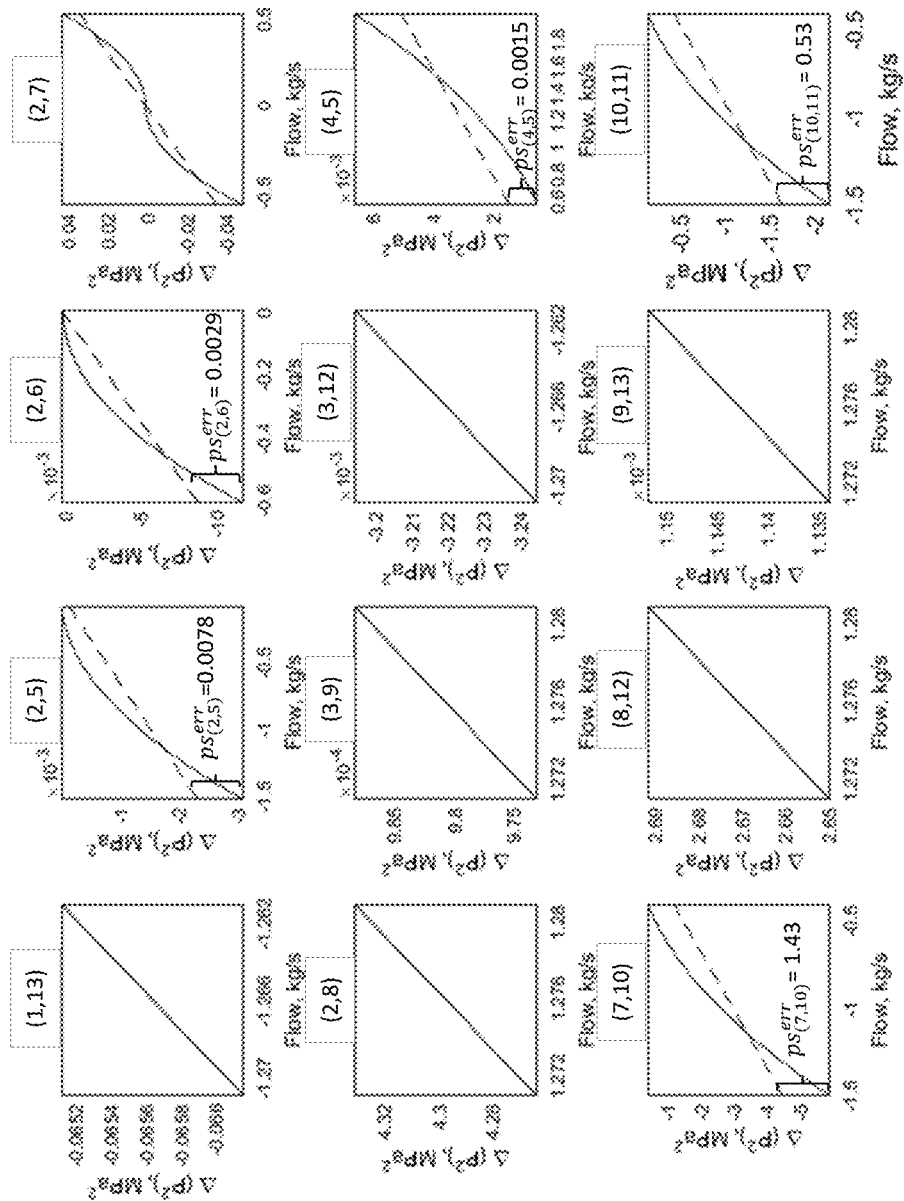
FIG. 11 illustrates identifying the maximum error in predicted pressure drop for each pipe segment.

The next step in an implementation of the invention is to linearize the nonlinear pressure drop relationship for each pipe segment in the network. The results of the linearization are shown in FIG. 11. Each subgraph shows a range of flows for a particular pipe segment (on the x-axis), with the corresponding change in squared pressure (on the y-axis). The solid plot line shows the nonlinear pressure drop relationship, and the dashed line shows the least-squares linear fit of the nonlinear pressure drop relationship over the flow range.

Key parameters are results associated with the arcs in the undirected graph are shown in Table 2. The table shows the length and diameter of each pipe segment, as well as the nonlinear pressure drop coefficient α. The table also shows Once flow rates in each pipe segment have been bounded, and the linearized pressure drop model for each pipe has been created, the next step is to bound the potential pressure prediction error associated with the linearization. The maximum absolute pressure drop error for the pipe segments is shown in fifth column of Table 2, and the maximum absolute pressure error for network nodes is shown in the seventh column of Table 1.

Next, a network flow solution is computed using the linear program:

| GIVEN | |
|---|---|
| $d_n$ $\forall n \in N$ | Demand rate in node n |
| $(m_j, b_j)$ $\forall j \in P$ | Linearized pressure drop model for pipe j |
| $ps_n^{err}$ $\forall n \in N$ | Maximum squared pressure error for node n, given linearized pressure drop models |
| $s_n^{min} < s_n < s_n^{max}$ | Minimum and maximum production rates at node n |
| CALCULATE | |
| $q_j$ $\forall j \in A$ | Flow rate in arcs |
| $s_n$ $\forall n \in S$ | Production rate in supply node |
| $d_n$ $\forall n \in D$ | Rate supplied to demand node |
| $ps_n^{node}$ $\forall n \in N$ | Squared pressure at each node |
| $ps_j^e$ $\forall j \in A$ | Squared pressure at the ends of each arc |
| SUCH THAT | |
| $d_n + \Sigma_{j|(n,j) \in A_{in}} q_j = \Sigma_{j|(n,j) \in A_{out}} q_j + s_n$ $\forall n \in N$ | Node mass balance |
| $ps_j^{in} = ps_n^{node}$ $\forall (n,j) \in A_{in}$ | Node pressure equality constraints |
| $ps_j^{out} = ps_n^{node}$ $\forall (n,j) \in A_{out}$ | Node pressure equality constraints |
| $ps_j^{in} - ps_j^{out} = m_j q_j + b_j$ $\forall j \in P$ | Linearized pressure drop model for pipes |
| $ps_n^{min} + ps_n^{err} \le ps_n^{node} \le ps_n^{max} - ps_n^{err}$, $\forall n \in N$ | Pressure bounds with margin for error |
| $s_n^{min} < s_n < s_n^{max}$ $\forall n \in S$ | Production bounds |
| $d_n^{min} < d_n < d_n^{max}$ $\forall n \in D$ | Demand bounds |

Figure 12:
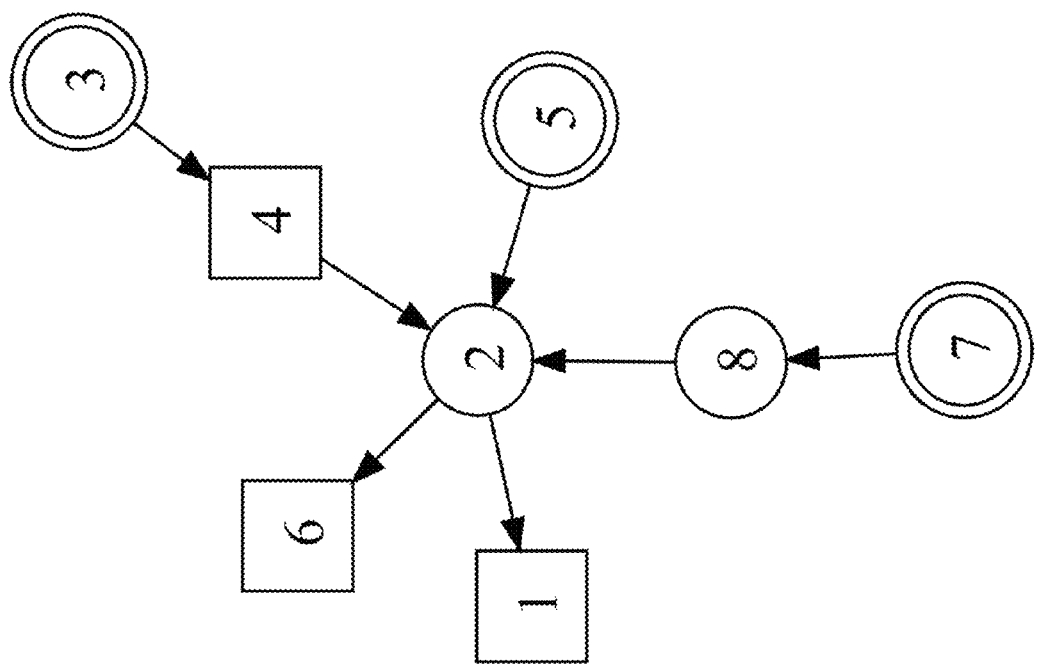
FIG. 12 shows the directions of flows for the network flow solution.

The results of the linear program include a specification of the flow rate in each pipeline arc, the quantity $q_j$ which is shown in the eighth column of Table 2. The results also include a specification of the production rate at each plant which is required to meet network pressure constraints. FIG. 12 shows the direction of flows in the network from the network flow solution.

Figure 13:
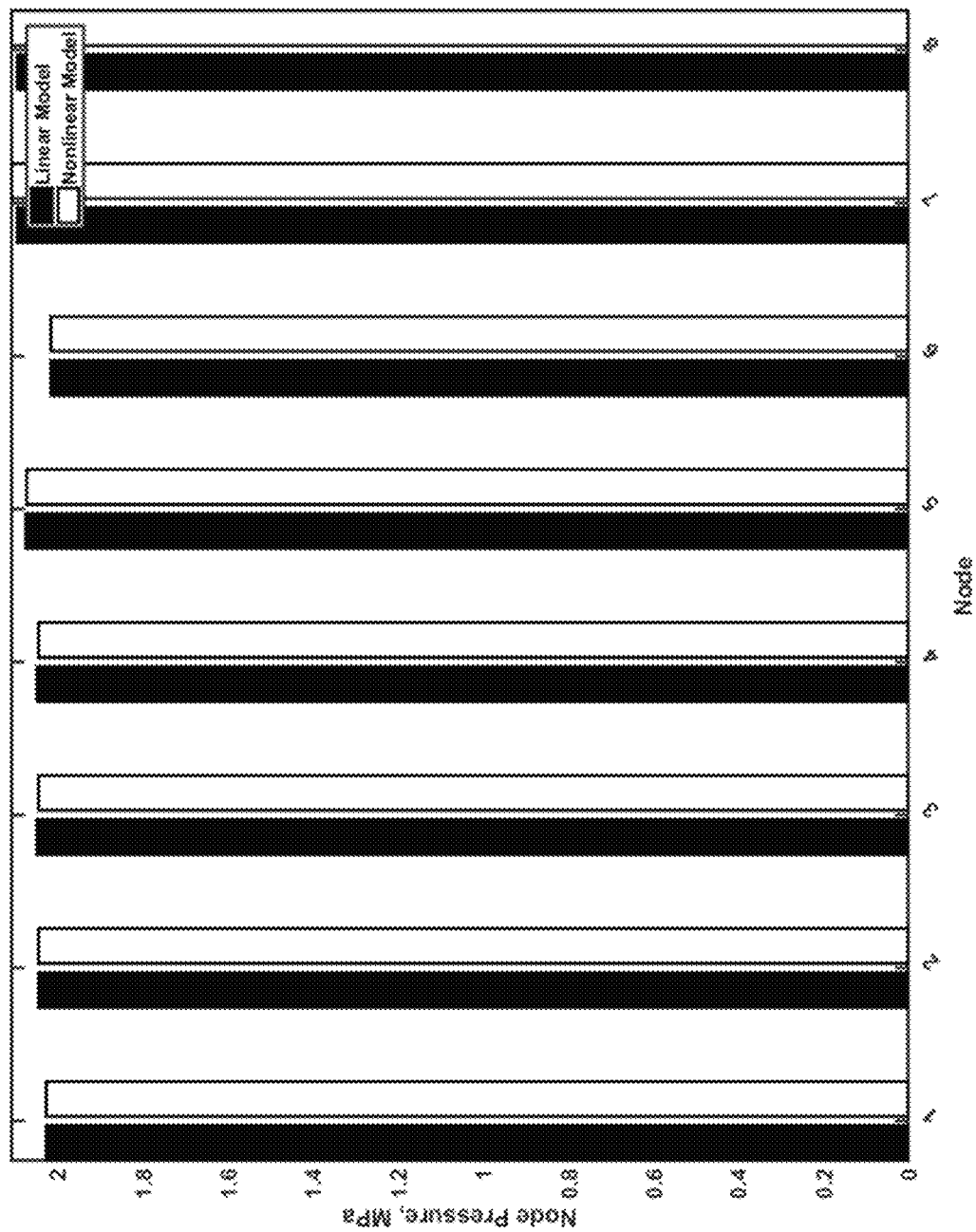
FIG. 13 shows pressures for each node in the pipeline network, as predicted by the linear and nonlinear model for the network flow solution.
Figure 14:
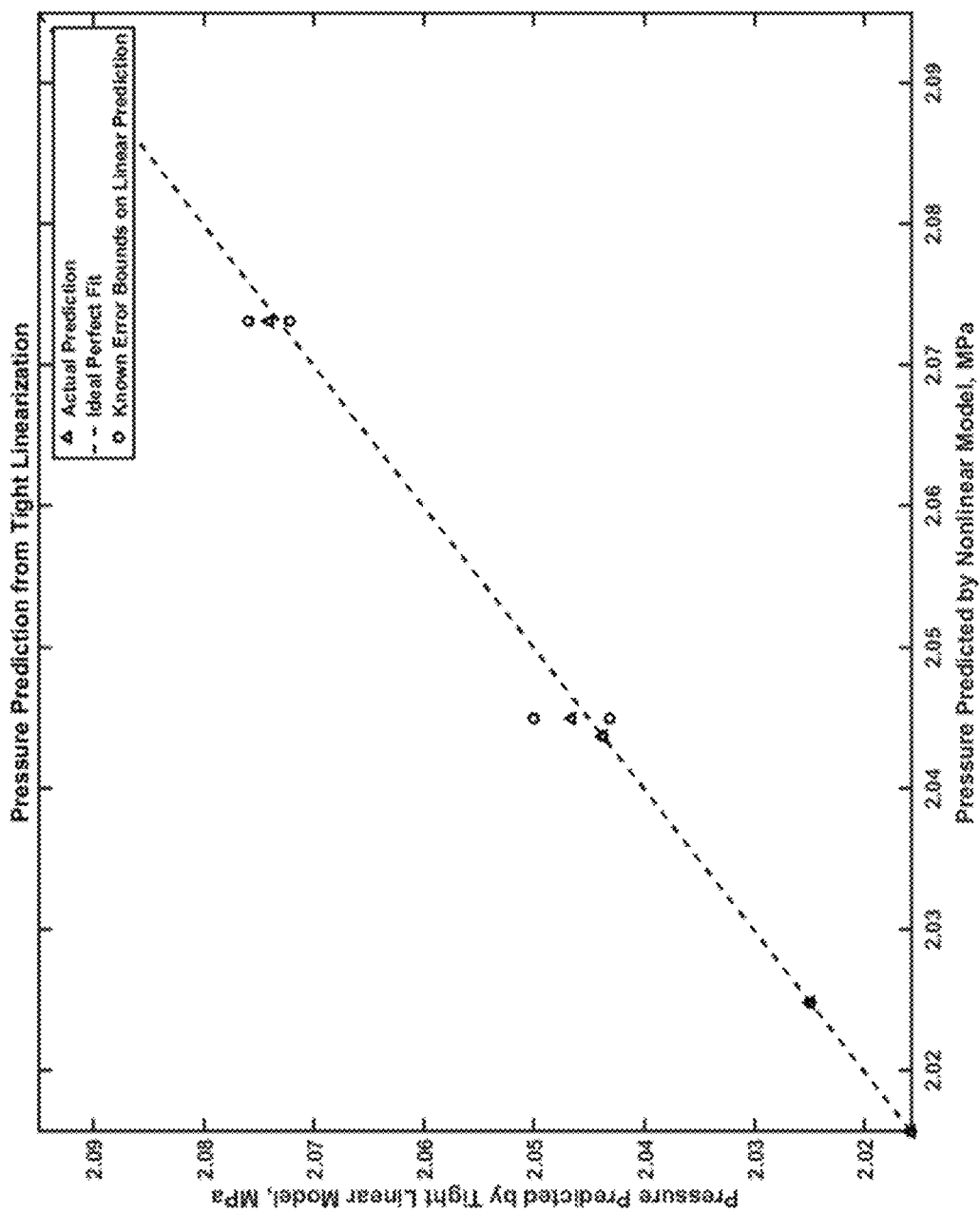
FIG. 14 is a diagram showing that the pressure predictions of the tight linear model agree well with those of the nonlinear model, and that lower bounds on pressure for customer nodes are satisfied.

FIG. 13 and FIG. 14 show that the pressures associated with the linear models in the network flow solution match closely the pressures that would be predicted by the nonlinear models, given the flows from the network flow solution. Furthermore, as shown in FIG. 14, the prior bounds calculated to bound the error associated with the pressure prediction from the linear model do, indeed, contain the pressure that would be calculated from the nonlinear model. This guarantees that the flow solution from the linear program will satisfy the pressure constraints, given the true nonlinear relationship between pressure and flow.

Figure 15:
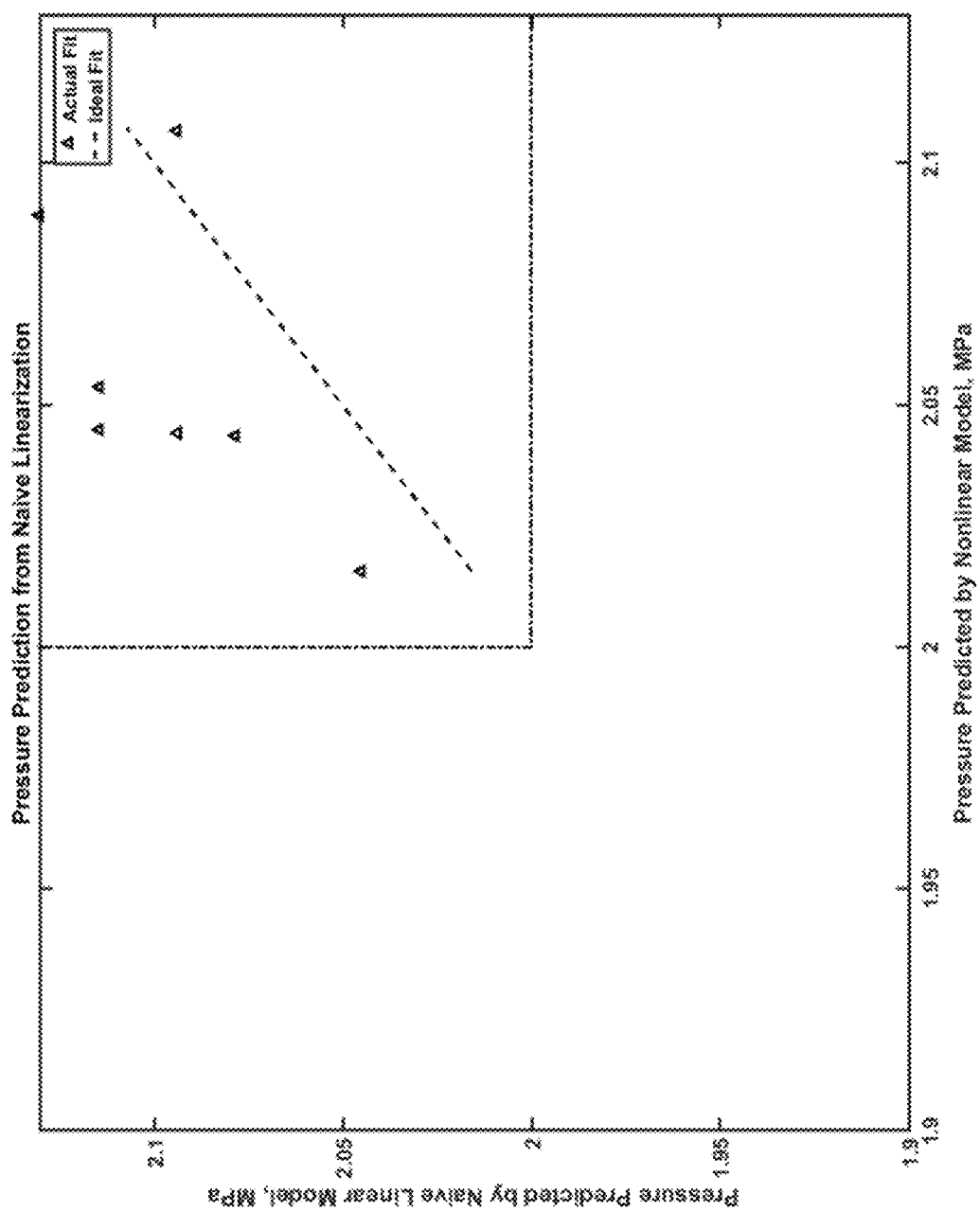
FIG. 15 shows the inaccurate pressure predictions which result from a naive linearization of the nonlinear pressure drop relationship.

Finally, with regard to this example, it is noted that a more naïve linearization of the pressure drop, such as simply bounding the flow in any pipe based on the total network demand for hydrogen, produces pressure estimates which do not closely match those of the nonlinear model. This result is illustrated in FIG. 15.

Figure 16:
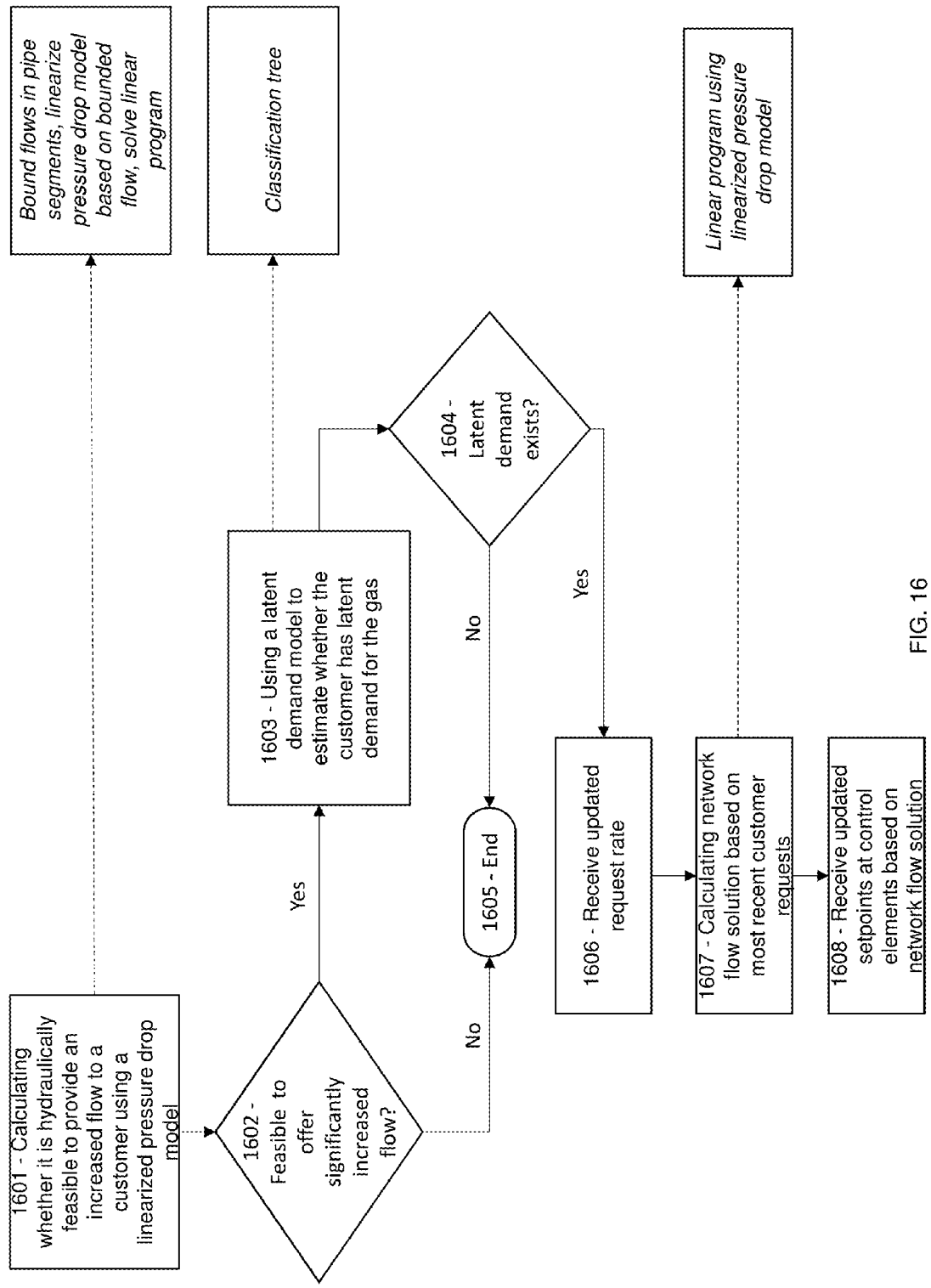
FIG. 16 is a flowchart illustrating a preferred embodiment a method of the present invention.

FIG. 16 is a flow chart illustrating an exemplary embodiment of the present invention. Exemplary steps of the method are shown in sequence, alongside an exemplary preferred means of implementing each step. In step 1601, whether it is hydraulically feasible to provide an increased flow to a customer using a linearized pressure drop model is calculated. In an exemplary embodiment, this may be accomplished by through bounding the flow in pipe segments, linearizing the pressure drop model based on the bounded flow, and solving the linear program. In step 1602, it is determined whether it is feasible to offer significantly increased flow. If not, the process ends in step 1605. If so, in step 1603, a latent demand model is used to estimate whether the customer has latent demand for the gas. This may be accomplished, in an exemplary embodiment, using a classification tree. In step 1604, it is determined if latent demand exists. If not, the process ends in step 1605. If so, in step 1606 an updated request rate is received. In step 1607, a network flow solution is calculated based on most recent customer requests. In one embodiment, this may be accomplished through linear program using a linearized pressure drop model. In step 1608, updated setpoints are received at the control elements based on network flow solution.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

The invention claimed is:

1. A system for controlling delivery of gas comprising:
   a gas pipeline network comprising at least one gas production plant, at least one gas receipt facility of a customer, a plurality of pipeline segments, and a plurality of control elements;
   one or more processors configured to:
      determine hydraulic feasibility of providing an increased flow rate of the gas to the gas receipt facility of the customer using a linearized pressure drop model;
      estimate a latent demand of the customer for the gas using a latent demand model which takes as inputs intrinsic and extrinsic factors, wherein the latent demand comprises a condition under which the customer would benefit from a flow rate of gas that is higher than a current consumption of gas by the customer;
      receive a new customer gas flow rate request based on the hydraulic feasibility and the latent demand and
      calculate a network flow solution based on the new gas flow rate request, the network flow solution being associated with control element setpoints; and
   one or more controllers receiving data describing the control element setpoints and controlling at least some of the plurality of control elements based on the data describing the control element setpoints;
   wherein flow of gas within each of the plurality of pipeline segments is associated with a direction, the direction being associated with a positive sign or a negative sign, and wherein the one or more processors are further configured to use the linearized pressure drop model, wherein the linearized pressure drop model is obtained by linearizing a nonlinear pressure drop relationship for at least some of the plurality of pipeline segments for flow rates between a minimum signed flow rate and a maximum signed flow rate for at least some of the plurality of pipeline segments, the minimum and maximum signed flow rates being calculated by:
      bisecting a mathematical model of the gas pipeline network using at least one of the plurality of pipeline segments to create a left subnetwork and right subnetwork;
      calculating a minimum undersupply in the left subnetwork by subtracting a sum of demand rates for each of the gas receipt facilities in the left subnetwork from a sum of minimum production rates for each of the gas production plants in the left subnetwork;
      calculating a minimum unmet demand in the right subnetwork by subtracting a sum of maximum production rates for each of the gas production plants to the right subnetwork from a sum of demand rates for each of the gas receipt facilities in the right subnetwork; calculating the minimum signed flow rate for at least one of the pipeline segments as a maximum of the minimum undersupply in the left subnetwork and the minimum unmet demand in the right subnetwork;
      calculating a maximum oversupply in the left subnetwork by subtracting the sum of the demand rates for each of the gas receipt facilities in the left subnetwork from the sum of the maximum production rates for each of the gas production plants in the left subnetwork;

calculating a maximum unmet demand in the right subnetwork by subtracting a sum of the minimum production rates for each of the gas production plants in the right subnetwork from the sum of the demand rates for each of the gas receipt facilities in the right subnetwork; and calculating the maximum signed flow rate for at least one of the pipeline segments as a minimum of the maximum oversupply in the left subnetwork and the maximum unmet demand in the right subnetwork.

2. The system of claim 1, wherein flow of gas within each of the plurality of pipeline segments is associated with a direction, the direction being associated with a positive sign or a negative sign, and wherein one or more of the one or more processors is further configured to develop the linearized pressure drop model by:

calculating a minimum signed flow rate and a maximum signed flow rate for each of the plurality of pipeline segments as a function of the increased flow rate of the gas to the gas receipt facility of the customer; and linearizing a nonlinear pressure drop relationship for at least some of the plurality of pipeline segment for flow rates between the minimum signed flow rate and the maximum signed flow rate.

3. The system of claim 1 where the latent demand model comprises a machine learning model.

4. The system of claim 3 wherein the machine learning model comprises a classification tree.

5. The system of claim 3 wherein the machine learning model comprises a support vector machine.

6. The system of claim 1, where the gas comprises hydrogen and at least one of the gas receipt facilities comprises a petroleum refinery.

7. A system for controlling delivery of gas comprising:

a gas pipeline network comprising at least one gas production plant, at least one gas receipt facility of a customer, a plurality of pipeline segments, and a plurality of control elements;

one or more processors configured to:
  determine hydraulic feasibility of providing an increased flow rate of the gas to the gas receipt facility of the customer using a linearized pressure drop model;
  estimate a latent demand of the customer for the gas using a latent demand model;
  receive a new customer gas flow rate request based on the hydraulic feasibility and the latent demand; and
  calculate a network flow solution based on the new gas flow rate request, the network flow solution being associated with control element setpoints; and one or more controllers receiving data describing the control element setpoints and controlling at least some of the plurality of control elements based on the data describing the control element setpoints;

wherein flow of gas within each of the plurality of pipeline segments is associated with a direction, the direction being associated with a positive sign or a negative sign, and wherein the one or more processors are further configured to calculate a minimum signed flow rate and a maximum signed flow rate for at least some of the plurality of pipeline segments by:

bisecting a mathematical model of the gas pipeline network using at least one of the plurality of pipeline segments to create a left subnetwork and right subnetwork;

calculating a minimum undersupply in the left subnetwork by subtracting a sum of demand rates for each of the gas receipt facilities in the left subnetwork from a sum of minimum production rates for each of the gas production plants in the left subnetwork;

calculating a minimum unmet demand in the right subnetwork by subtracting a sum of maximum production rates for each of the gas production plants in the right subnetwork from a sum of demand rates for each of the gas receipt facilities in the right subnetwork;

calculating the minimum signed flow rate for at least one of the pipeline segments as a maximum of the minimum undersupply in the left subnetwork and the minimum unmet demand in the right subnetwork;

calculating a maximum oversupply in the left subnetwork by subtracting the sum of the demand rates for each of the gas receipt facilities in the left subnetwork from the sum of the maximum production rates for each of the gas production plants in the left subnetwork;

calculating a maximum unmet demand in the right subnetwork by subtracting a sum of the minimum production rates for each of the gas production plants in the right subnetwork from the sum of the demand rates for each of the gas receipt facilities in the right subnetwork; and calculating the maximum signed flow rate for at least one of the pipeline segments as a minimum of the maximum oversupply in the left subnetwork and the maximum unmet demand in the right subnetwork.

8. The system of claim 7, wherein the linearized pressure drop model is obtained by linearizing a nonlinear pressure drop relationship between the minimum signed flow rate and the maximum signed flow rate.

9. The system of claim 7 where the latent demand model comprises a machine learning model.

10. The system of claim 9 wherein the machine learning model comprises a classification tree.

11. The system of claim 9 wherein the machine learning model comprises a support vector machine.

12. The system of claim 7, where the gas comprises hydrogen and at least one of the gas receipt facilities comprises a petroleum refinery.

* * * * *